United States Patent
Herbig et al.

(10) Patent No.: US 12,192,635 B2
(45) Date of Patent: *Jan. 7, 2025

(54) CONTROLLING A TWO-DIMENSIONAL MIRROR GIMBAL FOR PURPOSES OF IRIS SCANNING

(71) Applicant: Worldcoin Foundation, Georgetown (KY)

(72) Inventors: Sandro Herbig, Erlangen (DE); Auguste Pugnet, Erlangen (DE); Alex Blania, Erlangen (DE); Fabian Bodensteiner, Erlangen (DE); Christian Brendel, Erlangen (DE); Tobias Weidner, Erlangen (DE); Cyrus Tabrizi, Erlangen (DE); Saturnin Pugnet, Erlangen (DE); Johannes Thäter, Erlangen (DE); Daniel Haertsfelder, Erlangen (DE)

(73) Assignee: Worldcoin Foundation, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,944

(22) Filed: Feb. 5, 2024

(65) Prior Publication Data

US 2024/0179414 A1 May 30, 2024

Related U.S. Application Data

(63) Continuation of application No. 17/458,303, filed on Aug. 26, 2021, now Pat. No. 11,895,404.

(30) Foreign Application Priority Data

Aug. 25, 2021 (EP) .................................... 21193124

(51) Int. Cl.
*H04N 23/695* (2023.01)
*G03B 17/56* (2021.01)
(Continued)

(52) U.S. Cl.
CPC ......... *H04N 23/695* (2023.01); *G03B 17/561* (2013.01); *G03B 17/565* (2013.01);
(Continued)

(58) Field of Classification Search
CPC .. H04N 5/23299; H04N 13/25; G03B 17/561; G03B 17/565; G06V 40/171; G06V 40/19; G06V 40/193
See application file for complete search history.

(56) References Cited

U.S. PATENT DOCUMENTS

| 5,717,512 A | 2/1998 | Chmielewski et al. |
| 11,895,404 B2 * | 2/2024 | Herbig .................. H04N 13/25 |

(Continued)

FOREIGN PATENT DOCUMENTS

| EP | 4141820 A1 | 3/2023 |
| KR | 20070117027 A | 12/2007 |

(Continued)

OTHER PUBLICATIONS

Zhang, et al., "Multispectral Biometrics", doi: 10.1007/978-3-319-22485-5, 2016, 232 Pages.

(Continued)

*Primary Examiner* — Christopher K Peterson
(74) *Attorney, Agent, or Firm* — Calfee, Halter & Griswold LLP

(57) ABSTRACT

An iris scanning device includes a first camera that captures an image of a face of a user and a second camera that captures an image of an eye of the user subsequent to the image of the face being captured. The iris scanning device includes a gimbal having a mirror mounted thereon and a (Continued)

facial feature detector that identifies facial features of the user based upon the image of the face. The iris scanning device further includes control circuitry that adjusts an orientation of the gimbal based upon the facial features, where the image of the eye is captured upon the orientation of the gimbal being adjusted, and where the mirror mounted on the gimbal is oriented to cause the image of the eye to be captured. An iris of the eye of the user may be located in a central region of the image of the eye.

20 Claims, 15 Drawing Sheets

(51) Int. Cl.
  *G06V 40/16* (2022.01)
  *G06V 40/18* (2022.01)
  *G06V 40/19* (2022.01)
  *H04N 13/25* (2018.01)

(52) U.S. Cl.
  CPC ............ *G06V 40/171* (2022.01); *G06V 40/19* (2022.01); *G06V 40/193* (2022.01); *H04N 13/25* (2018.05)

(56) References Cited

U.S. PATENT DOCUMENTS

| | | |
|---|---|---|
| 2003/0053513 A1 | 3/2003 | Vatan et al. |
| 2012/0200689 A1 | 8/2012 | Friedman et al. |
| 2014/0050367 A1 | 2/2014 | Chen et al. |
| 2015/0085096 A1 | 3/2015 | Smits |
| 2017/0020627 A1 | 1/2017 | Tesar et al. |
| 2020/0065569 A1 | 2/2020 | Nduka et al. |
| 2020/0160028 A1 | 5/2020 | Ma et al. |
| 2023/0062777 A1 | 3/2023 | Herbig et al. |

FOREIGN PATENT DOCUMENTS

| | | |
|---|---|---|
| WO | 199808439 A1 | 8/1997 |
| WO | 2010056542 A1 | 5/2010 |
| WO | 2020078440 A1 | 4/2020 |
| WO | 2023028242 A1 | 3/2023 |

OTHER PUBLICATIONS

"Modi Vision for Identification", Retrieved From: https://www.modivision.net/?lang=en, Retrieved Date: Sep. 9, 2021, 10 Pages.
"International Search Report and Written Opinion for PCT Patent Application No. PCT/US22/41543", Mailed Date: Dec. 19, 2022, 18 pages.
"Extended European Search Report for European Patent Application No. 21193124.1", Mailed Date: Mar. 4, 2022, 11 pages.
"Response to Communication Pursuant to Rule 69 EPC and Invitation Pursuant to Rule 70a(1) EPC for European Patent Application No. 21193124.1", Filed Date: Aug. 31, 2023, 41 pages.
"Restriction Requirement for U.S. Appl. No. 17/458,303", Mailed Date: Nov. 28, 2022, 6 pages.
"Response to Restriction Requirement for U.S. Appl. No. 17/458,303", filed Jan. 30, 2023, 10 pages.
"Office Action for U.S. Appl. No. 17/458,303", Mailed Date: Mar. 7, 2023, 31 pages.
"Response to Office Action for U.S. Appl. No. 17/458,303", filed Sep. 7, 2023, 17 pages.
"Notice of Allowance and Fees Due for U.S. Appl. No. 17/458,303", Mailed Date: Sep. 22, 2023, 10 pages.
"Corrected Notice of Allowability for U.S. Appl. No. 17/458,303", Mailed Date: Oct. 4, 2023, 7 pages.

\* cited by examiner

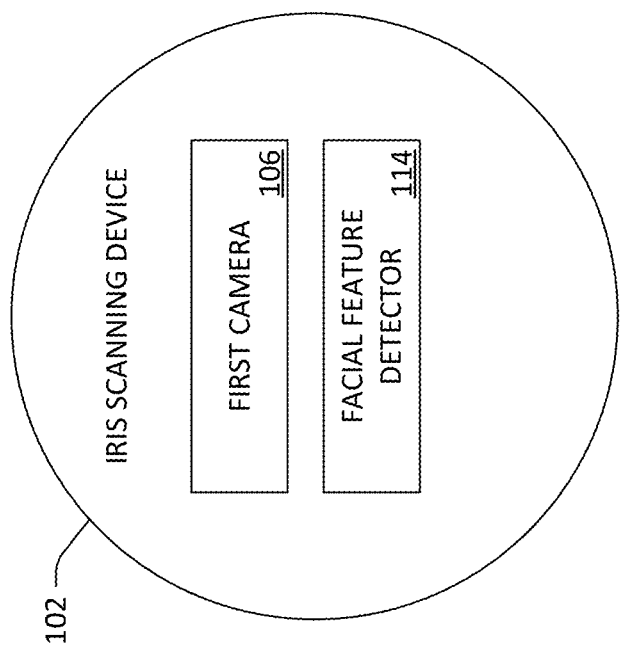
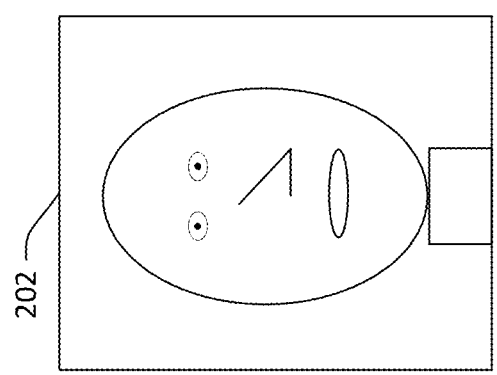
FIG. 2A

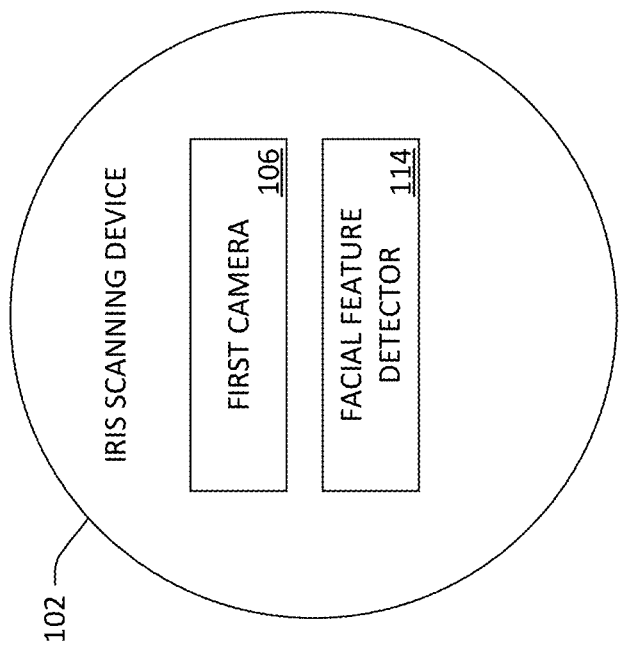
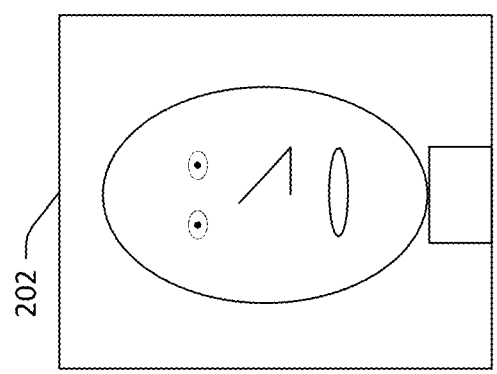
FIG. 2B

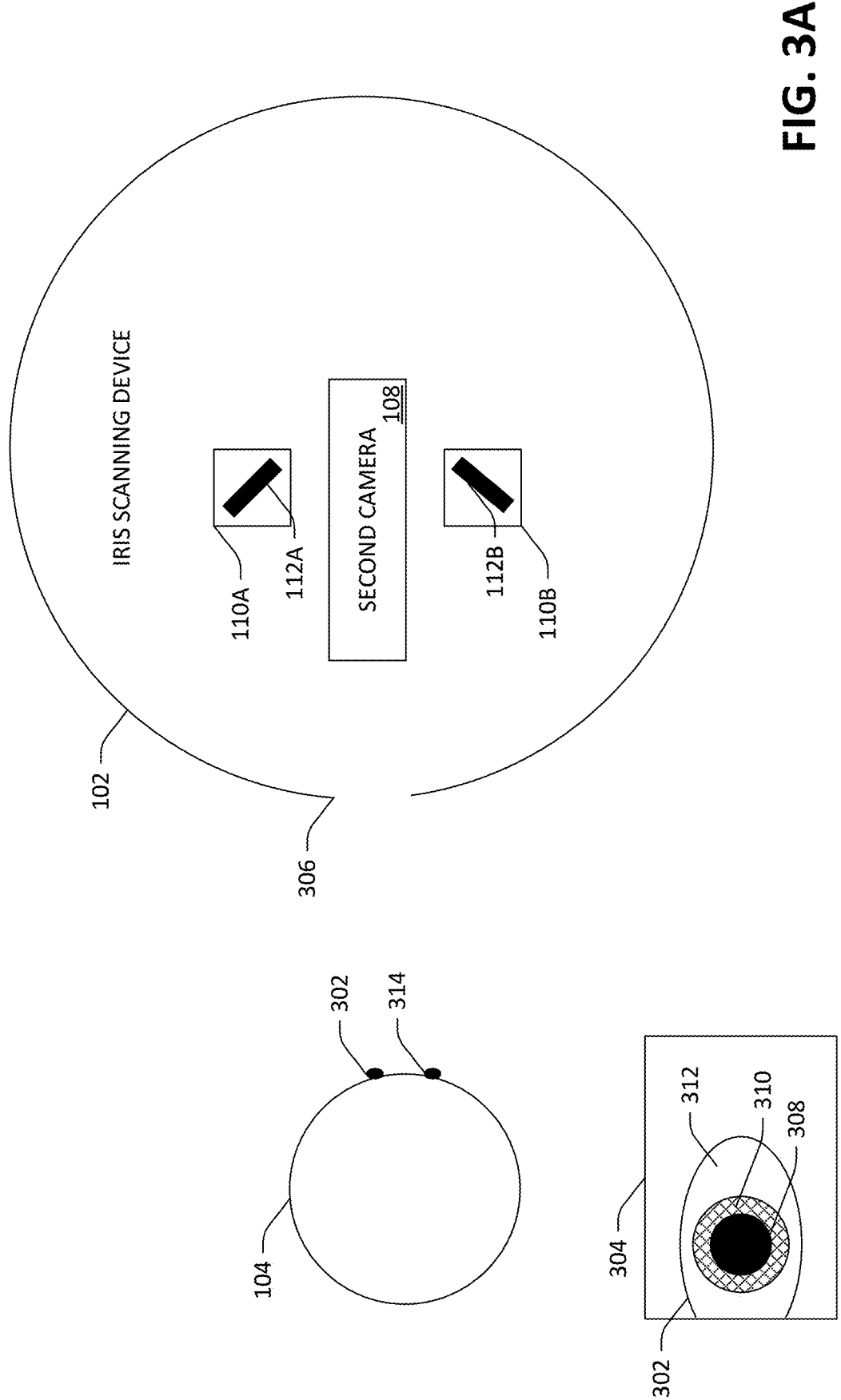

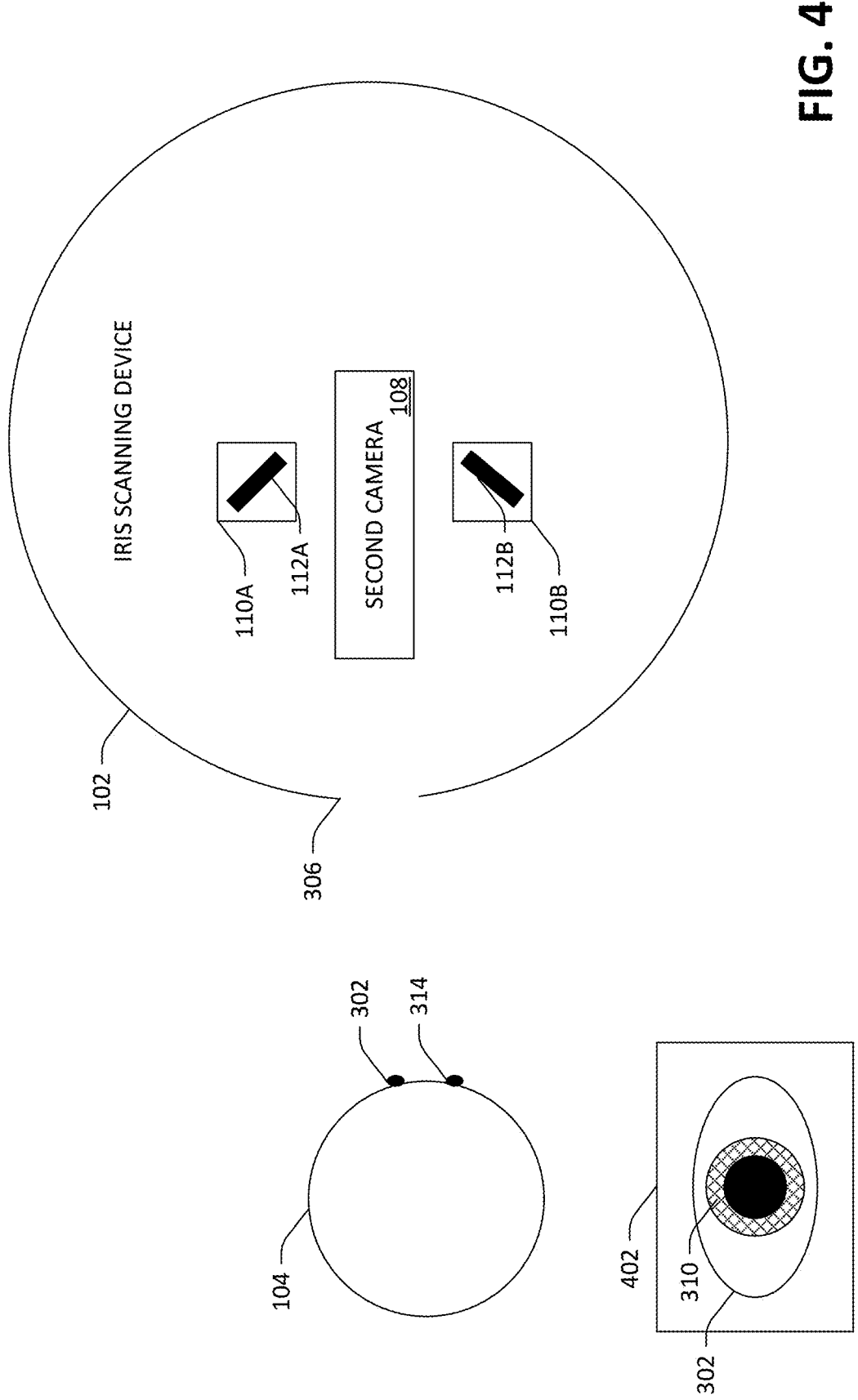

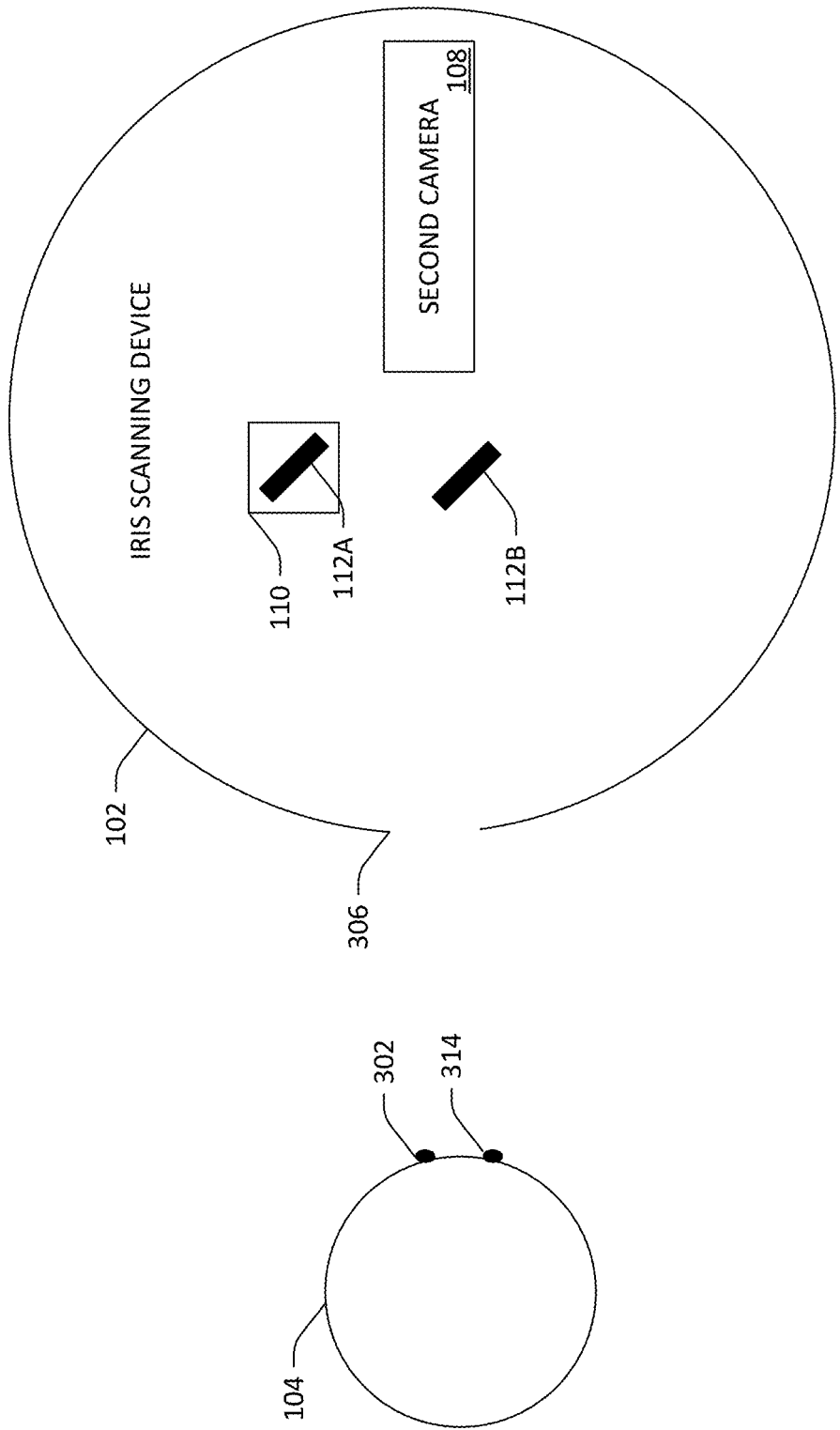

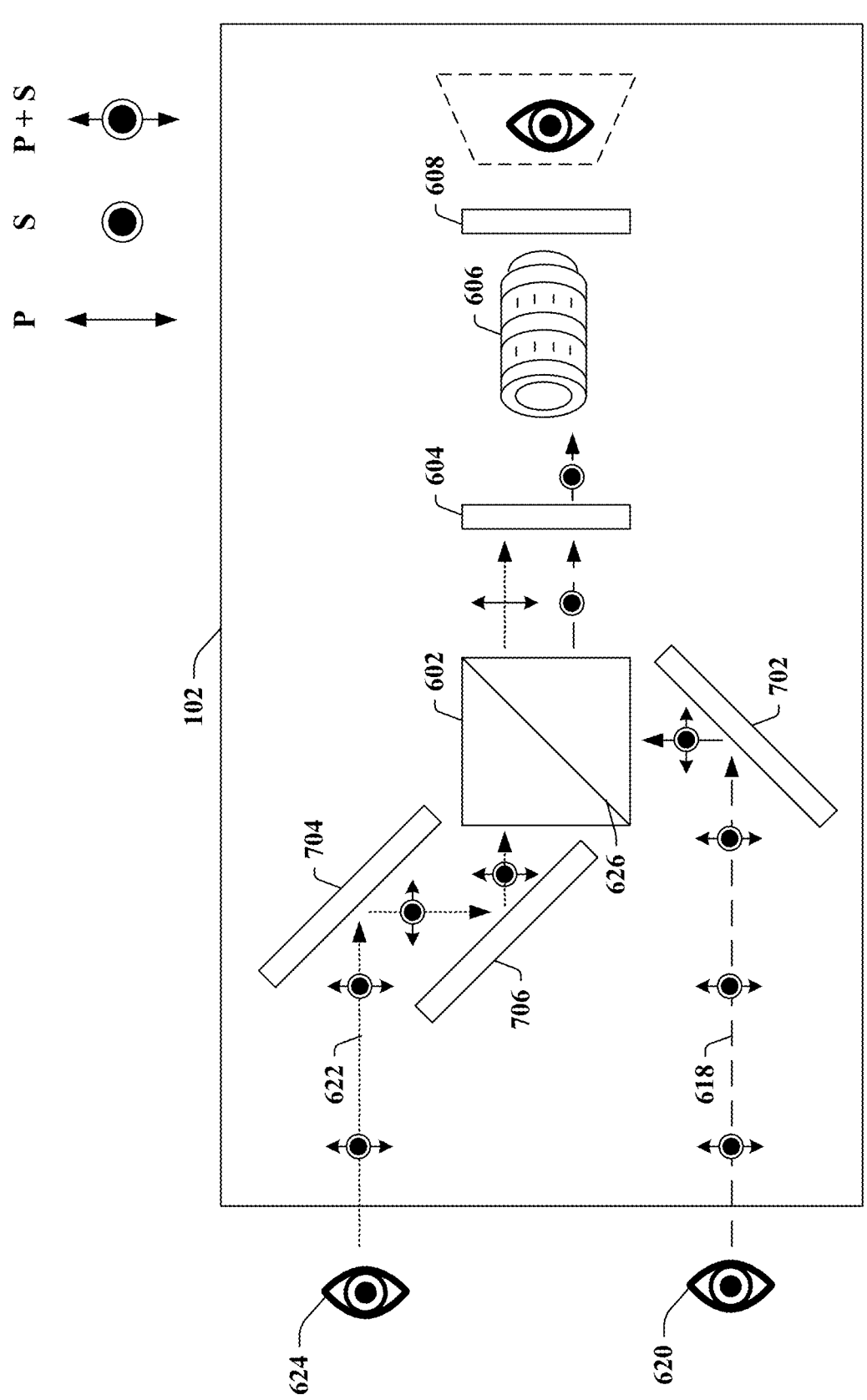

CONTROLLING A TWO-DIMENSIONAL MIRROR GIMBAL FOR PURPOSES OF IRIS SCANNING

RELATED APPLICATION

This application is a continuation of U.S. patent application Ser. No. 17/458,303, filed on Aug. 26, 2021, and entitled "CONTROLLING A TWO-DIMENSIONAL MIRROR GIMBAL FOR PURPOSES OF IRIS SCANNING", which claims priority to European Patent Application No. EP21193124.1, filed on Aug. 25, 2021. The entireties of these applications are incorporated herein by reference.

BACKGROUND

Iris scanning is a method of biometric identification that uses pattern-recognition techniques on images of one or both irises of eyes of an individual. Conventional iris scanning devices tend to be mounted in a fixed location so as to facilitate iris tracking. Conventional iris scanning devices also tend to include two separate imaging sensors that respectively scan a left iris of the individual and a right iris of the individual. Conventional iris scanning devices additionally tend to require the individual to orient his/her eyes within a relatively short distance of an imaging sensor (e.g., several centimeters), which may be uncomfortable for the individual. Furthermore, conventional iris scanning devices have difficulty tracking an iris of the user.

SUMMARY

The following is a brief summary of subject matter that is described in greater detail herein. This summary is not intended to be limiting as to the scope of the claims.

Various technologies pertaining to controlling a two-dimensional mirror gimbal for purposes of iris scanning are described herein. With more particularity, an iris scanning device is described herein that is configured to adjust an orientation of a gimbal having a mirror mounted thereon such that an image of an eye of a user of the iris scanning device is captured. The image of the eye of the user may have an iris of the eye of the user located in a central region of the image of the eye and is well-suited for biometric identification purposes. Furthermore, the iris scanning device is portable and can perform iris scans at arm's length distances (e.g., 15 cm to 50 cm).

In operation, an iris scanning device captures an image of a face of a user by way of a first camera. The iris scanning device identifies facial features of the user based upon the image of the face of the user. The iris scanning device adjusts an orientation of a gimbal having a mirror mounted thereon based upon the facial features, where the gimbal and the mirror are disposed within an interior of the iris scanning device. The iris scanning device captures an image of an eye of the user (e.g., a left eye) by way of a second camera comprised by the iris scanning device, where the mirror is oriented to cause the image of the eye of the user to be captured. The first camera and the second camera have different field of views. According to an embodiment, the first camera is a red green blue (RGB) camera and the second camera is an infrared (IR) camera. When the image of the eye of the user satisfies criteria, the iris scanning device may output an indication to the user that a scan of an iris of the user has been successful. The criteria may include one of the iris of the eye being located in a central region of the image of the eye, an entirety of the eye being located in the image of the eye, and/or an area occupied by the iris in the image of the eye being greater than a threshold area. The criteria may also include a sharpness of the image of the eye being greater than a threshold sharpness. When the image of the eye of the user does not satisfy the criteria, the iris scanning device identifies features of the eye (via the second camera) based upon the image of the eye, (re)adjusts the orientation of the gimbal based upon the features of the eye, and captures a second image of the eye of the user by way of the second camera. According to embodiments, the second camera captures a continuous video stream (e.g., 30 or 60 frames per second (FPS)) of the eye of the user. This process may be repeated multiple times in order to capture an image that satisfies the criteria. Furthermore, the iris scanning device may scan a second eye of the user (e.g., a right eye) in a similar manner.

The above-described technologies present various advantages over conventional iris scanning devices. First, unlike conventional iris scanners, the iris scanning device described above can perform iris scans at an arm's length distance, which improves the iris scan experience for users. Second, the iris scanning device described above is portable (e.g., handheld), which adds flexibility to the iris scanning process. Third, vis-à-vis the mirror and the gimbal, the iris scanning device described above can utilize a single camera in order to perform scans of both irises of the user. Fourth, through the iterative process described above whereby a gimbal is adjusted based upon facial features identified from a first image captured by a first camera (i.e., coarse adjustment) and then (potentially) readjusted based upon features of an eye identified from a second image captured by a second camera (i.e., fine adjustment), the iris scanning device can capture an image of an eye of the user that is suitable for biometric identification purposes. As such, the iris scanning device described above can perform iris scans even when the iris scanning device is not held completely stationary while the first camera and/or the second camera capture their respective images.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 2A-B depict an iris scanning device capturing an image of a face of a user and identifying facial features of the user based upon the image.

FIGS. 3A-B depict an iris scanning device capturing an image of a portion of an eye of a user and identifying features of the eye of the user based upon the image.

FIG. 4 depicts an iris scanning device capturing an image of an eye of a user.

FIG. 5 depicts an alternative embodiment of an iris scanning device having a first mirror mounted on a gimbal and a second mirror that is stationary.

FIG. 7 illustrates an example of the iris scanning device of FIG. 1.

DETAILED DESCRIPTION

Figure 1:
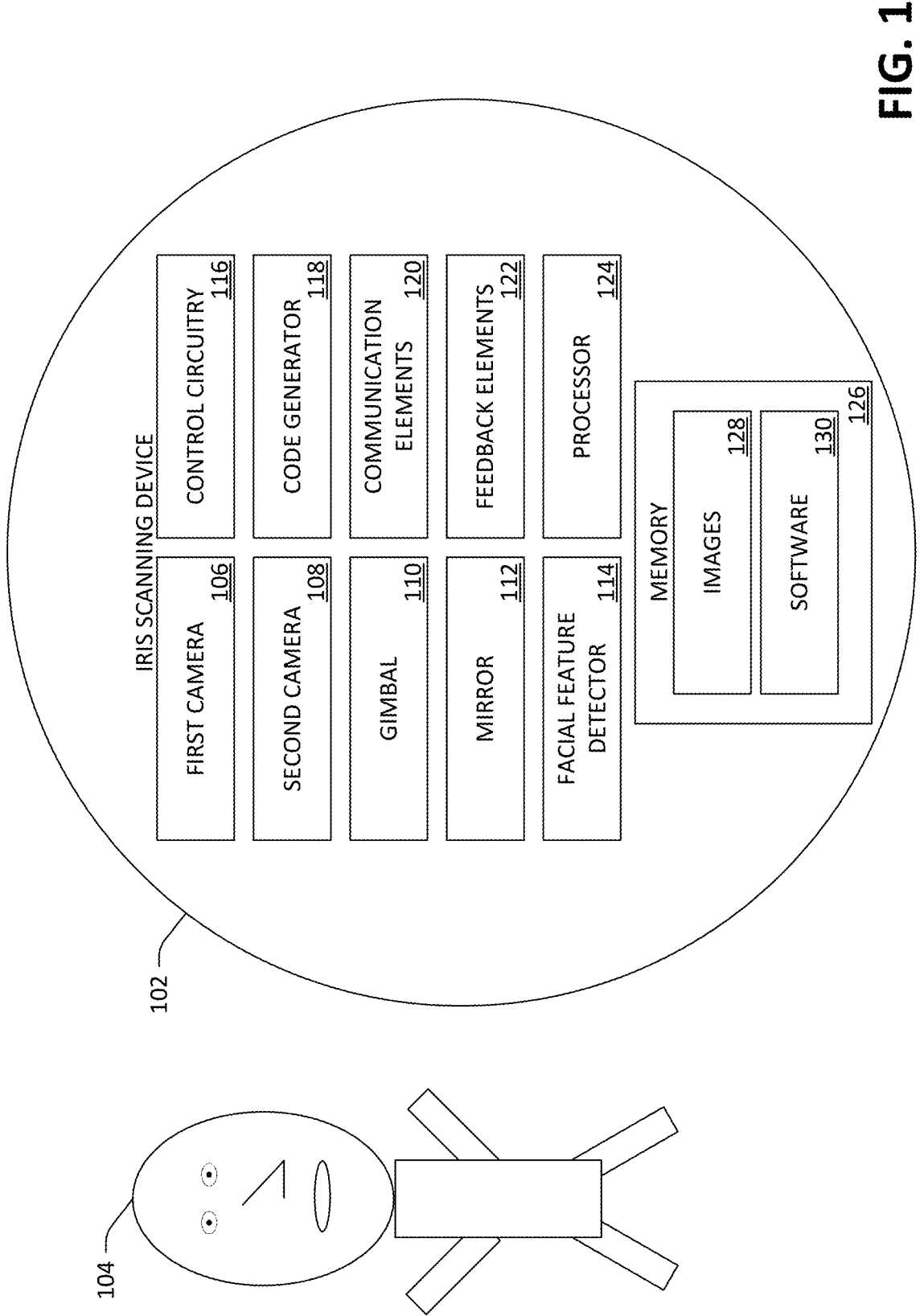
FIG. 1 is a functional block diagram of an exemplary iris scanning device that is in proximity to a user.

Various technologies pertaining to controlling a two-dimensional mirror gimbal for purposes of iris scanning are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

As noted above, conventional iris scanning devices tend to be stationary, utilize separate imaging sensors for each eye, and require a user to place his/her eyes in close proximity to an image sensor in order for an iris scan of a user to be completed. To address these deficiencies, an iris scanning device (also referred to as "an orb") is described herein that comprises a first camera, a second camera, and a gimbal having a mirror mounted thereon, where the first camera and the second camera have different field of views and are configured for different purposes.

In operation, an iris scanning device captures an image of a face of a user by way of a first camera (e.g., a red green blue (RGB) camera). The iris scanning device identifies facial features of the user based upon the image of the face of the user. The iris scanning device adjusts an orientation of a gimbal having a mirror mounted thereon based upon the facial features, where the gimbal and the mirror are disposed within an interior of the iris scanning device. The iris scanning device captures an image of an eye of the user (e.g., a left eye) by way of a second camera comprised by the iris scanning device, where the mirror is oriented to cause the image of the eye of the user to be captured. The first camera and the second camera have different field of views. When the image of the eye of the user satisfies criteria, the iris scanning device may output an indication to the user that a scan of an iris of the user has been successful (or that scans of both irises of the user have been successful). The criteria include one or more of the iris of the eye being located in a central region of the image of the eye, an entirety of the eye being located in the image of the eye, and/or an area occupied by the iris in the image of the eye being greater than a threshold area. When the image of the eye of the user does not satisfy the criteria, the iris scanning device identifies features of the eye based upon the image of the eye, (re)adjusts the orientation of the gimbal based upon the features of the eye, and captures a second image of the eye of the user by way of the second camera. According to embodiments, the second camera captures a continuous video stream (e.g., 30 or 60 frames per second (FPS)) of the eye of the user. This process may be repeated multiple times in order to capture an image that satisfies the criteria. Furthermore, the iris scanning device may scan a second eye of the user (e.g., a right eye) in a similar manner.

The above-described technologies present various advantages over conventional iris scanning devices. First, unlike conventional iris scanners, the iris scanning device described above can perform iris scans at an arm's length distance, which improves the iris scan experience for users. Second, the iris scanning device described above is portable (e.g., handheld), which adds flexibility to the iris scanning process. Third, vis-à-vis the mirror and the gimbal, the iris scanning device described above can utilize a single camera in order to perform scans of both irises of the user. Fourth, through the iterative process described above whereby a gimbal is adjusted based upon facial features identified from a first image captured by a first camera (i.e., coarse adjustment) and then (potentially) readjusted based upon features of an eye identified from a second image captured by a second camera (i.e., fine adjustment), the iris scanning device can capture an image of an eye of the user that is suitable for biometric identification purposes. As such, the iris scanning device described above can perform iris scans even when the iris scanning device is not held completely stationary while the first camera and/or the second camera capture their respective images.

With reference to FIG. 1, an exemplary iris scanning device 102 that is configured to capture an image of an eye of a user 104 is illustrated. It is to be understood that the iris scanning device 102 and the user 104 are not drawn to scale in FIG. 1 (or any of the other figures described herein). It is contemplated that the iris scanning device 102 (also referred to as "the orb 102") is a handheld device that is held in a hand or hands of the user 104 (or in a hand or hands of another person that is in proximity to the user 104). According to embodiments, the iris scanning device 102 is spherical (or approximately spherical). It is contemplated that the iris scanning device 102 includes a casing that defines a volume inside of the iris scanning device 102, where some or all of the components of the iris scanning device 102 (to be described below) are located within the volume defined by the casing. The casing of the iris scanning device 102 may be opaque; however, the iris scanning device 102 includes an aperture that is transparent for IR light, but not transparent to visible light. According to embodiments, the casing of the iris scanning device 102 comprises a first portion and a second portion, where the first portion has a mirror surface and where the second portion is a clear shell, where the second portion defines a "top" of the iris scanning device 102.

The iris scanning device 102 includes a first camera 106 that is configured to capture an image of a face of the user 104. According to embodiments, the image of the face of the user 104 includes body parts of the user 104 that are located on a head of the user 104 (e.g., ears, hair, nose, mouth, eyes, cheeks, forehead, lips, etc.). The image of the face of the user 104 may also include a neck of the user 104 and/or shoulders of the user 104. According to some embodiments, the first camera 106 is a red green blue (RGB) camera. According to other embodiments, the first camera 106 is an infrared (IR) camera, such as a monochrome (i.e., grayscale) IR camera. According to embodiments, the first camera 106 has a field of view that ranges from 60° to 180°, such as 80° to 160°, 100° to 140°, or 115° to 125°. According to embodiments, a lens of the first camera 106 has a focal length that ranges from 1 mm to 5 mm, such as 1.2 to 4 mm, 1.5 to 3 mm, or 1.7 to 1.9 mm. According to embodiments, the lens of the first camera 106 has a focal length of 1.88 mm.

The iris scanning device 102 further includes a second camera 108 that is configured to capture an image of an eye of the user 104 (as opposed to the whole face of the user 104). According to embodiments, the second camera 108 captures a continuous video stream (e.g., 30 or 60 frames per second (FPS)) of the eye of the user 104. The second camera 108 is located inside of the iris scanning device 102. It is contemplated that the image of the eye of the user 104 includes an entirety (or a majority) of the eye of the user 104. It is further contemplated that the image of the eye of the user 104 has an iris of the eye of the user 104 located in a central region of the image of the eye of the user 104. According to embodiments, the second camera 108 is an infrared (IR) camera. According to embodiments, the second camera 108 has a field of view that ranges from 2° to 10°, such as 3° to 9°, 4° to 8°, or 4.5° to 5.5°. According to embodiments, a lens of the second camera 108 has a focal length that ranges from 30 mm to 150 mm, such as 40 mm to 120 mm, 50 mm to 100 mm, or 75 mm to 85 mm. According to embodiments, a distance between the lens of the second camera 108 and an eye of the user 104 when the image of the eye of the user 104 is captured ranges from 15 cm to 50 cm (e.g., an arm's length).

The iris scanning device 102 further includes a gimbal 110 having a mirror 112 mounted thereon. The gimbal 110 and the mirror 112 are located inside of the iris scanning device 102. According to embodiments, the gimbal 110 is a two-axis gimbal (also referred to as a "two-dimensional gimbal"). As will be described in greater detail below, the iris scanning device 102 is configured to adjust an orientation of the gimbal 110 such that the mirror 112 is oriented to cause an image (or images) of the eye of the user 104 to be captured. The gimbal 110 is motorized. According to embodiments, the mirror 112 may be planar, convex, or concave. According to embodiments, the gimbal 110 includes a first gimbal and a second gimbal and the mirror 112 includes a first mirror and a second mirror, where the first mirror is mounted on the first gimbal and where the second mirror is mounted on the second gimbal. According to embodiments, the gimbal 110 is a single gimbal and the mirror 112 is a single mirror, where the single mirror is mounted on the single gimbal and where the single mirror/single gimbal can be used to image each eye of the user 104 sequentially during different time periods. As will be described below, the first mirror/first gimbal may be configured to reflect light that is reflected off of a first eye of the user 104 (e.g., a left eye) and the second mirror/second gimbal may be configured to reflect light that is reflected off of a second eye of the user 104 (e.g., a right eye). According to embodiments, the gimbal 110 is built using parallel linkage. According to other embodiments, the gimbal 110 is built using serial linkage. According to some embodiments, the gimbal 110 is a higher-axis mechanical system that is controlled n software to behave like a system having lower-axes. According to embodiments, a position of the gimbal 110 may be adjusted (independent of rotation of the gimbal). For example, the gimbal may be mounted on one or more elements that define an x-axis, a y-axis, and/or a z-axis. The iris scanning device 102 may adjust a position of the gimbal 110 on the one or more elements.

The iris scanning device 102 further includes a facial feature detector 114. The facial feature detector 114 may be implemented in hardware, software, or a combination thereof. The facial feature detector 114 is configured to identify facial features (e.g., mouth, nose, eyes, etc.) of the user 104 based upon an image of a face of the user 104. The facial features detector 114 is also configured to identify features of an eye of the user 104 based upon an image of the eye of the user 104.

The iris scanning device 102 further includes control circuitry 116. The control circuitry 116 is configured to adjust an orientation of the gimbal 110 (and as a result, the mirror 112 as well) based upon the facial features of the user 104 and/or the features of the eye of the user 104 that are identified by the facial feature detector 114. With more particularity, the control circuitry 116 is configured to transmit electrical signals to a motor of the gimbal 110, where the motor of the gimbal 110 causes the gimbal 110 to rotate.

The iris scanning device 102 may further include a iris code generator 118 that is configured to generate a code based upon pixels of an image of an eye of the user 104. In an example, the code generator 118 may apply a hash function to the pixels of the image of the eye of the user 104 in order to generate the code. According to embodiments, the code is a n-dimensional vector embedded code, where n is a positive integer. According to embodiments, the code is a 128-dimensional vector embedded code. According to embodiments, the code may be utilized to distribute cryptocurrency to the user 104.

The iris scanning device 102 further includes communication elements 120 that enable the orb to communicate with different computing devices. The communication elements 120 may include wired or wireless communication elements. According to embodiments, the communication elements 120 may include a Wi-Fi radio, a Long Term Evolution (LTE® module), a Bluetooth radio, and/or a universal serial bus (USB) controller. According to embodiments, the iris scanning device 102 may include a High-Definition Multimedia Interface (HDMI®) that enables the iris scanning device 102 to be connected to an external display, where the external display may display graphical features (e.g., instructions to the user 104 for capturing images via the iris scanning device 102, images of faces of users, images of eyes of users, etc.). According to embodiments, the iris scanning device 102 includes a display that displays the graphical features.

The iris scanning device 102 may include feedback elements 122 that are configured to output indications as to whether or not an image of the eye of the user 104 has been successfully captured by the second camera 108 and/or whether or not the image of the eye of the user 104 satisfies criteria (e.g., the image of the eye of the user 104 has an iris of the user 104 located in a central region of the image, an entirety of the eye is located in the image, the iris of the eye occupies an area in the image that is greater than a threshold area, etc.). According to embodiments, the feedback elements 122 include a speaker that outputs an audible indication, light emitting diodes (LEDs) that output a visible indication, and/or a haptic feedback device that outputs a vibration. According to embodiments, the iris scanning device 102 may communicate with a computing device operated by the user 104, such as through a web application being executed on the computing device.

The iris scanning device 102 includes a processor 124 and memory 126. The memory 126 stores images 128. The images 128 may include an image of a face of the user 104 and/or an image of an eye of the user 104. The memory 126 may also (temporarily) store a code (not illustrated in FIG. 1) generated by the code generator 118. It is contemplated that the images 128 are removed from the memory 126 subsequent to generation of the code.

The memory 126 may include software 130 that is executed by the processor 124. According to embodiments, some or all of the functionality of the facial feature detector 114 is implemented in the software 130 and the processor 124 executes the software 130 to perform some or all of the functionality of the facial feature detector 114. According to embodiments, some functionality of the control circuitry 116, the code generator 118, the communication elements 120, and/or the feedback elements 122 is also implemented in the software 130. According to embodiments, the memory 126 includes one or more computer-implemented machine learning models (not shown in FIG. 1) that are utilized by the facial feature detector 114 to identify facial features of the user 104 and/or features of an eye of the user 104 based upon an image of a face of the user 104 and/or an image of an eye of the user 104.

Although not depicted in FIG. 1, it is to be understood that the iris scanning device 102 includes a power supply (e.g., a battery) that powers the iris scanning device 102. Additionally or alternatively, the iris scanning device 102 may include a power port (not shown in FIG. 1) that enables the iris scanning device 102 to receive power from an external source and/or charge the battery. Furthermore, although not depicted in FIG. 1, it is to be understood that the iris scanning device 102 includes an on/off button that enables the iris scanning device 102 to be powered on/off.

According to embodiments, the iris scanning device 102 may include a three-dimensional camera (not shown in FIG. 1) that is configured to capture a three-dimensional image of the face of the user 104. The iris scanning device 102 may identify the facial features of the user 104 using the three-dimensional image. Alternatively, the iris scanning device 102 may utilize both a computer-implemented machine learning model in conjunction with the three-dimensional image in order to identify the facial features of the user 104.

According to embodiments, the iris scanning device 102 may include an infrared (IR) camera (not shown in FIG. 1) that is configured to capture an infrared image of the face of the user 104. The iris scanning device 102 may utilize the infrared image (along with the image captured by the first camera 106) in order to identify the facial features of the user 104.

Referring now to FIG. 1 and FIG. 2A, operation of the iris scanning device 102 is set forth. It is contemplated that the user 104 (or another person) is holding the iris scanning device 102 in one or both of his/her hands and that the iris scanning device 102 is powered on. It is further contemplated that a distance between a face of the user 104 and the iris scanning device 102 may range from 15 cm to 50 cm. It is also contemplated that the user 104 (or another person) holds the iris scanning device 102 in his/her hands as the iris scanning device 102 captures images and adjusts an orientation of the gimbal 110 (to be explained in greater detail below).

The user 104 (or another person holding the iris scanning device 102) orients that iris scanning device 102 such that a face of the user 104 is within a field of view of the first camera 106. According to embodiments, one or more of the feedback elements 122 output an indication to the user 104 when the face of the user 104 is within the field of view of the lens of the first camera 106. The first camera 106 captures an image 202 of the face of the user 104 (also referred to herein as "the facial image 202"). The facial image 202 includes body parts of the user 104 that are located on the head of the user 104 (e.g., eyes, mouth, etc.). The facial image 202 may also include a neck of the user 104 and/or shoulders of the user 104. The iris scanning device 102 causes the facial image 202 to be (temporarily) stored in the memory 126 as part of the images 128.

Referring now to FIGS. 1 and 2B, the facial feature detector 114 identifies facial features of the user 104 based upon the facial image 202. In an example, the facial feature detector 114 predicts locations of eyes of the user 104 based upon the facial image 202.

Figure 3B:
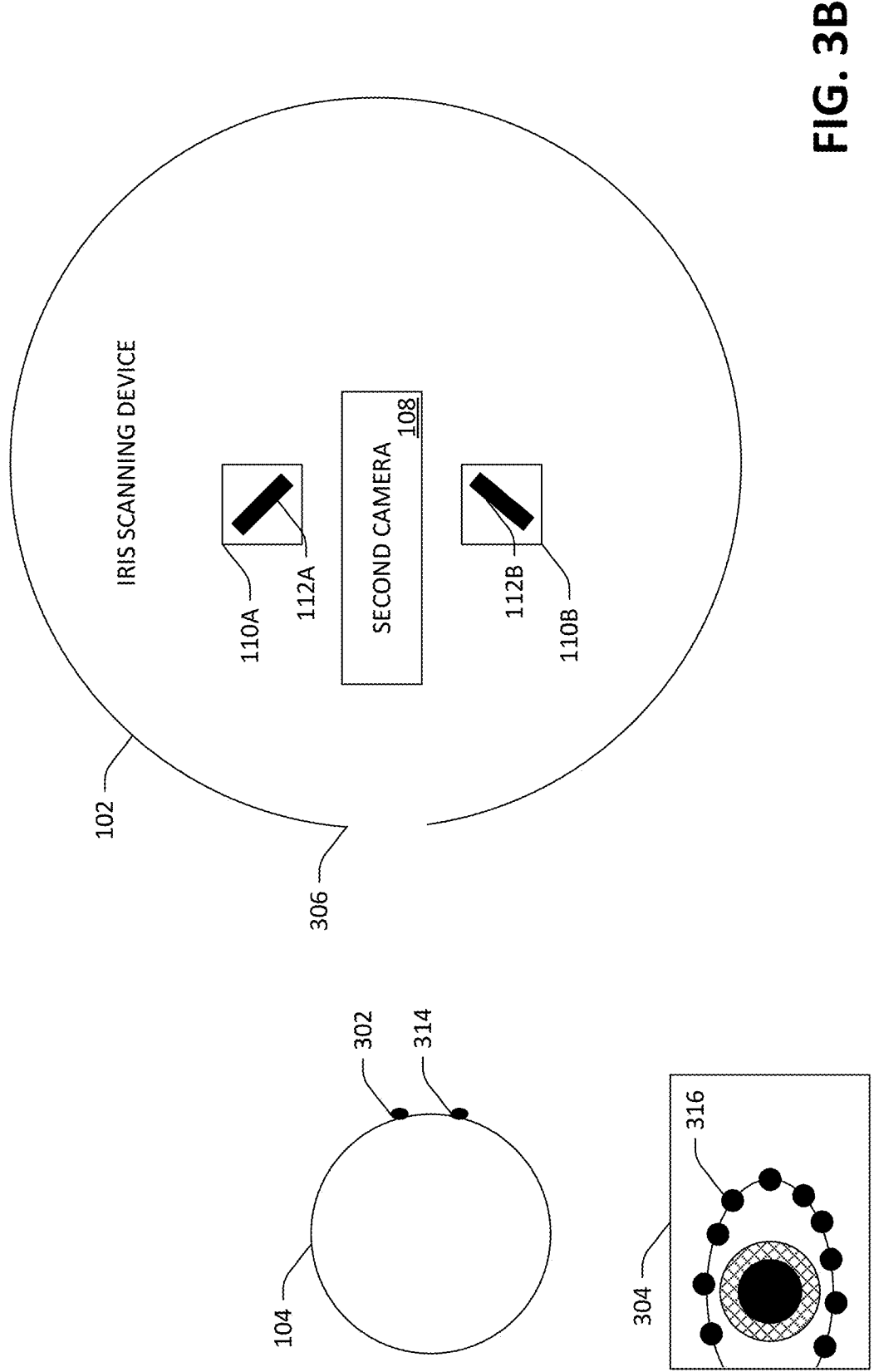

With reference now to FIGS. 1 and 3A, the facial feature detector 114 computes a desired angle between the mirror 112 mounted on the gimbal 110 and an eye 302 of the user 104 (shown from a top-down perspective in FIG. 3A) based upon the facial features. It is to be understood that the relative positions of the components (e.g., the aperture, mirrors, etc.) in FIG. 3A are not illustrated in the FIG. 3A (or in FIGS. 3B, 4, and 5). The facial feature detector 114 transmits the desired angle to the control circuitry 116. Upon receiving the desired angle, the control circuitry 116 adjusts an orientation of the gimbal 110 such that an angle between the eye 302 and the mirror 112 mounted on the gimbal 110 is the desired angle, where the mirror 112 is oriented to enable the second camera 108 to capture an image of the eye 302. The second camera 108 captures a first image 304 of the eye 302 of the user 104 (also referred to herein as "the first eye image 304"). With more particularity, light (e.g., infrared light) reflects off of the eye 302 of the user 104 and passes through an aperture 306 located on a surface of the iris scanning device 102. The aperture 306 is transparent or semi-transparent to IR light. According to embodiments, the aperture 306 is reflective, opaque, or transparent to visible light. The light reflects off of the mirror 112 within the iris scanning device 102. A lens of the second camera 108 receives the light, thereby causing the first eye image 304 to be captured. The iris scanning device 102 causes the first eye image 304 to be stored in the memory 126 as part of the images 128. It is contemplated that the first eye image 304 has a first resolution and that the facial image 202 has a second resolution, where the first resolution is greater than the second resolution. As the first eye image 304 has a higher resolution than the facial image 202, the facial feature detector 114 is able to more precisely determine a location of the eye 302 and therefore adjust orientation of the gimbal 110 (and hence the mirror 112) in a more accurate manner.

As used herein, the term "resolution" refers to pixel density per area in object space (and not image space on a sensor of a camera).

In an example, the first eye image 304 includes some, but not all of the eye 302 of the user 104. In a more specific example, the first eye image 304 includes a pupil 308 of the eye 302 of the user 104, an iris 310 (visually indicated in FIG. 3A by crosshatching) of the eye 302 of the user 104, and a portion of the sclera 312 of the eye 302 of the user 104. In a further example, the iris 310 is not located in a central region of the first eye image 304.

According to embodiments, the gimbal 110 comprises a first gimbal 110A and a second gimbal 110B and the mirror 112 comprises a first mirror 112A and a second mirror 112B, where the first mirror 112A is mounted on the first gimbal 110A and the second mirror 112B is mounted on the second gimbal 110B. The facial feature detector 114 computes a first desired angle between the eye 302 of the user 104 (referred to now in this example as "the left eye 302" for clarity) and the first mirror 112A based upon the facial features of the user 104. The facial feature detector 114 transmits the first desired angle to the control circuitry 116, whereupon the control circuitry 116 adjusts an orientation of the first gimbal 110A (and hence the first mirror 112A) to have the first desired angle. The second camera 108 captures an image of the left eye 302, where the image of the left eye 302 is based upon light reflected off of the first mirror 112A. The facial feature detector 114 also computes a second desired angle between a second eye 314 (referred to in this example now as "the right eye 314") of the user 104 and the second mirror 112B based upon the facial features of the user 104. The facial feature detector 114 transmits the second desired angle to the control circuitry 116, whereupon the control circuitry 116 adjusts an orientation of the second gimbal 110B (and hence the second mirror 112B) to have the second desired angle. The second camera 108 captures an image of the right eye 314, where the image of the right eye 314 is based upon light reflected off of the second mirror 112B. Alternative mirror configurations are described below in FIGS. 6-8.

With reference now to FIGS. 1 and 3B, the facial feature detector 114 identifies features of the eye 302 of the user 104 based upon the first eye image 304. In an example, the features of the eye 302 include a point 316 that is at a boundary of the eye 302. The facial feature detector 114 determines whether or not the first eye image 304 satisfies criteria based upon the features of the eye 302. In one example, the facial feature detector 114 determines whether or not the iris 310 is located in a central region of the first eye image 304 based upon the features of the eye 302. When the iris 310 is located in the central region of first eye image 304, the iris scanning device 102 outputs an indication via one or more of the feedback elements 122 that the first eye image 304 is sufficient for biometric identification purposes. In another example, the facial feature detector 114 determines whether the first eye image 304 includes an entirety of the eye 302 of the user 104 based upon the features of the eye 302 (or, stated differently, the facial feature detector 114 determines whether a portion of the eye 302 of the user 104 is not included in the first eye image 304). When the first eye image 304 includes the entirety of the eye 302 (or an entirety of an iris of the eye 302), the iris scanning device 102 outputs an indication via one or more of the feedback elements 122 that the first eye image 304 is sufficient for biometric identification purposes. In yet another example, the facial feature detector 114 identifies the iris 310 based upon the first eye image 304 and determines an area occupied by the iris 310 within the first eye image 304 based upon the features of the eye 302. When the area is greater than a threshold area, the iris scanning device 102 outputs an indication via one or more of the feedback elements 122 that the first eye image 304 is sufficient for biometric identification purposes. In a further example, the facial feature detector 114 determines a sharpness of the first eye image 304 and compares the sharpness to a threshold sharpness. When the sharpness exceeds the threshold sharpness, the iris scanning device 102 outputs an indication via one or more of the feedback elements 122 that the first eye image 304 is sufficient for biometric identification purposes. In another example, the facial feature detector 114 determines whether or not the eye 302 of the user 104 is open in the first eye image 304. When the eye 302 of the user 104 is open in the first eye image 304, the iris scanning device 102 outputs an indication via one or more of the feedback elements 122 that the first eye image 304 is sufficient for biometric identification purposes.

When the first eye image 304 does not meet the criteria (e.g., the iris 310 is not located centrally within the first eye image 304, the first eye image 304 does not include an entirety of the eye 302, the area occupied by the iris 310 in the first eye image 304 does not exceed the threshold area, the sharpness of the first image 304 does not exceed the threshold sharpness, and/or the eye 302 of the user 104 is not open in the first eye image 304), the iris scanning device 102 may output an indication via one or more of the feedback elements 122 that the first eye image 304 is not sufficient for biometric identification purposes. The facial feature detector 114 computes a desired angle between the eye 302 and the mirror 112 based upon the features of the eye 302 identified from the first eye image 304. The facial feature detector 114 transmits the desired angle to the control circuitry 116, whereupon the control circuitry 116 adjusts an orientation of the gimbal 110 (and hence the mirror 112) to have the desired angle, where the mirror having the desired angle facilitates capture of an image of the eye 302. According to embodiments, the iris scanning device 102 may calibrate a link between the first camera 106 and the second camera 108 based on a presented external pattern and adapt over time to age-related de-calibration.

Referring now to FIGS. 1 and 4, the second camera 108 captures a second image 402 of the eye 302 of the user 104 (also referred to herein as "the second eye image 402"). With more particularity, light reflects off of the eye 302 of the user 104 and passes through the transparent or semi-transparent aperture 306 located on the surface of the iris scanning device 102. The light reflects off of the mirror 112 within the iris scanning device 102. The lens of the second camera 108 receives the light, thereby causing the second eye image 402 to be captured. The iris scanning device 102 causes the second eye image 402 to be stored in the memory 126 as part of the images 128.

The facial feature detector 114 identifies features of the eye 302 based upon the second eye image 402 and determines whether or not the second eye image 402 meets the criteria (described above). In the example depicted in FIG. 4, the iris 310 of the eye 302 is located in a central region of the second eye image 402. Furthermore, the second eye image 402 does not include additional facial features other than the eye 302 (e.g., the second eye image 402 does not include a mouth of the user 104). As such, the second eye image 402 meets the criteria and the second eye image 402 is suitable for biometric identification purposes. The iris scanning device 102, via the feedback elements 122, may output an indication to the user 104 that the iris 310 of the user 104 has been successfully scanned. According to embodiments, the iris scanning device 102, via the feedback elements 122, may output alignment feedback to the user 104 via LEDs or sounds. When the second eye image 402 does not meet the criteria, the facial feature detector 114 identifies features of the eye 302 of the user 104 based upon the second eye image 402 and the iris scanning device 102 repeats the above-described steps until an image of the eye 302 is captured that meets the criteria. According to embodiments, the code generator 118 generates a code based upon the second eye image 402.

It is to be understood that the first eye image 304 may satisfy the above-described criteria. As such, it is to be understood that the second camera 108 of the iris scanning device 102 may capture a single image of the eye 302 of the user 104 that is suitable for biometric identification purposes (without going through the two-step process described above where the first eye image 304 is captured by the second camera 108 and then the second eye image 402 is captured by the second camera 108).

In an example, after capture of an image of the eye 302 of the user 104, the iris scanning device 102 readjusts orientation of the gimbal 110 based upon the facial features of the user 104, where the mirror 112 mounted on the gimbal 110 is now oriented to cause an image of the second eye 314 of the user 104 to be captured. Upon readjusting the orientation of the gimbal 110, the iris scanning device 102 captures a second image of the second eye 314 of the user 104 by way of the second camera 108. The iris scanning device 102 determines whether an iris of the eye 302 is located in a central region of the image of the eye 302 and whether an iris of the second eye 314 is located in a central region of the second image of the second eye of the user 104. When the iris of the eye 302 is located in the central region of the image of the eye 302 and when the iris of the second eye 314 is located in the central region of the second image, the iris scanning device 102 outputs an audible and/or visible indication to the user 104 by way of the feedback elements 122.

Turning now to FIG. 5, an alternative embodiment of the iris scanning device 102 is illustrated. In the embodiment depicted in FIG. 5, the mirror 112 includes a first mirror 112A and a second mirror 112B. The first mirror 112A is mounted on the gimbal 110; however, the second mirror 112B is stationary. According to the embodiment, the facial feature detector 114 determines facial features and/or features of an eye 302 of the user 104 as described above, computes a desired angle between the mirror 112A and the eye 302 of the user 104, and transmits the desired angle to the control circuitry 116. The control circuitry 116 adjusts an orientation of the gimbal 110 (and hence the first mirror 112A) to have the desired angle. The second camera 108 then captures an image of the eye 302 (referred to in this example as the left eye 302) of the user 104. With more particularity, light reflects off of the left eye 302 of the user 104 (the light may be ambient light and/or light emitted from a light source comprised by the iris scanning device 102), passes through the aperture 306, reflects off of the first mirror 112A, reflects off of the second mirror 112B, and is ultimately received at a lens of the second camera 108. The iris scanning device 102 may perform similar operations to capture an image of the second eye 314 of the user 104.

Figure 6:
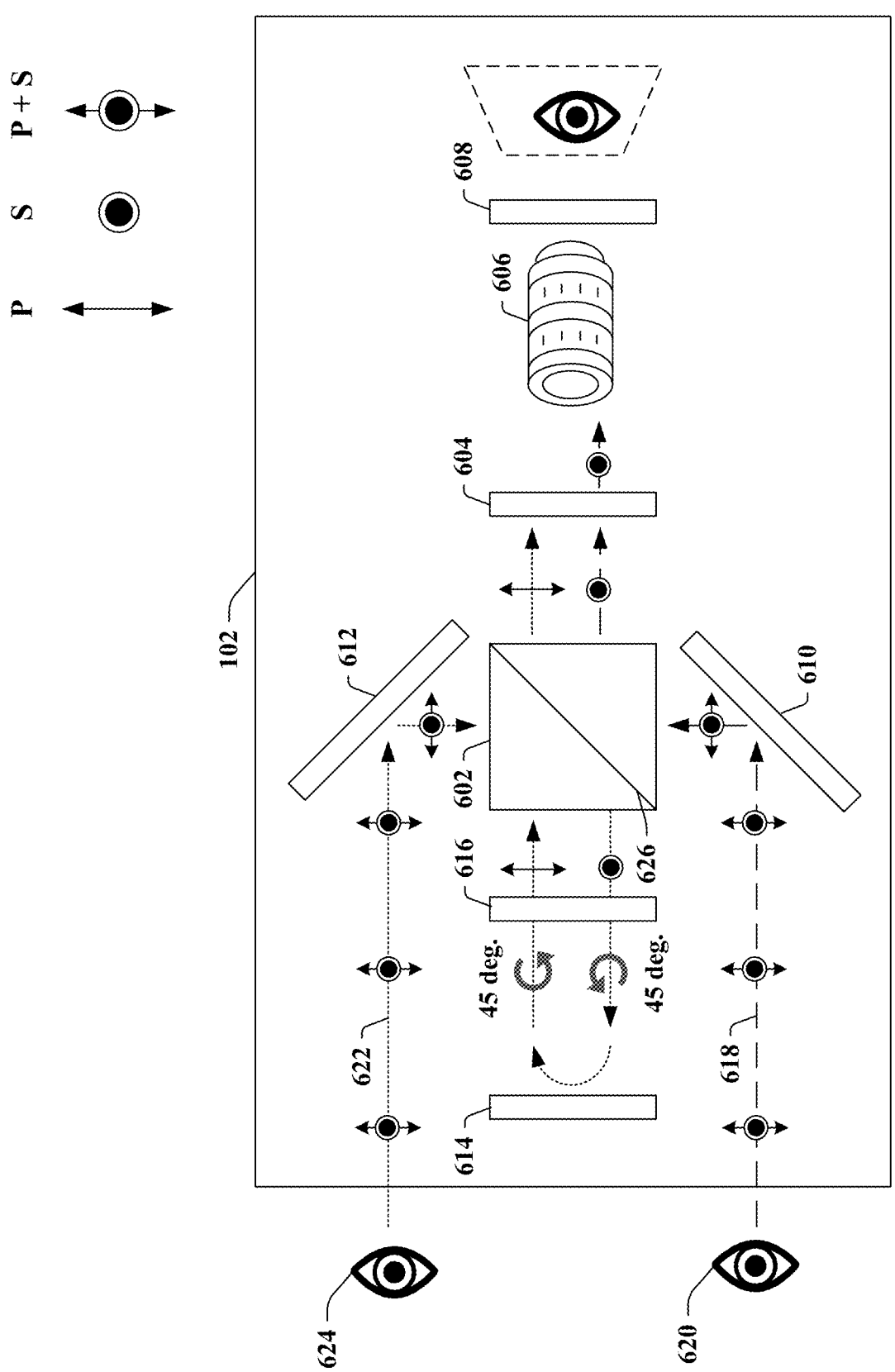
FIG. 6 illustrates an example of the iris scanning device of FIG. 1.

Referring now to FIG. 6, another example of the iris scanning device 102 is illustrated. The iris scanning device 102 includes a polarization beam splitter 602, a polarization selector 604, a lens 606, and a camera sensor 608. The polarization beam splitter 602, the polarization selector 604, the lens 606, and the camera 608 may correspond to the second camera 108 described above. The iris scanning device 102 in FIG. 6 includes a first mirror 610 and the second mirror 612. Further, the iris scanning device 102 depicted in FIG. 6 includes a third mirror 614 and a quarter waveplate 616.

The first mirror 610 is configured to reflect a first optical signal 618 from a first eye 620 of the user 104 to the polarization beam splitter 602. Moreover, the second mirror 612 is configured to reflect the second optical signal 622 from a second eye 624 of the user 104 to the polarization beam splitter 602. The first mirror 610 can be a movable mirror (e.g., mounted on a gimbal) that can align with the first eye 620 (e.g., using the above-described processes). Moreover, the second mirror 612 can be a movable mirror (e.g., mounted on a gimbal) that can align with a second eye 624 (e.g., using the above-described processes). Further, the first optical signal 618 received at and reflected by the first mirror 610 can include both A and B polarizations, where A polarization is one of P or S polarizations and where B polarization is S polarization when A polarization is P polarization and where B polarization is P polarization when A polarization is S polarization. Likewise, the second optical signal 622 received at and reflected by the second mirror 612 can include both A and B polarizations.

The polarization beam splitter 602 can optically communicate a first portion of the first optical signal 618 having a first polarization to the polarization selector 604. As illustrated, the first portion of the first optical signal 618 having S polarization is reflected by a polarizing mirror 626 of the polarization beam splitter 602 towards the polarization selector 604. Moreover, the polarization beam splitter 602 inhibits optical communication of a second portion of the first optical signal 618 having a second polarization to the polarization selector 604. For instance, the second portion of the first optical signal 618 having P polarization can pass through the polarizing mirror 626 (e.g., without being reflected towards the polarization selector 604). A path of the second portion of the first optical signal 618 having P polarization is not shown in FIG. 6, as this portion of the first optical signal 618 may be discarded.

The polarization beam splitter 602 can also optically communicate a second portion of the second optical signal 622 having the second polarization to the polarization selector 604, and can inhibit optical communication of a first portion of the second optical signal 622 having the first polarization to the polarization selector 604. As depicted in FIG. 6, the second portion of the second optical signal 622 having P polarization is optically communicated by the polarization beam splitter 602 towards the polarization selector 604. More particularly, the polarization beam splitter 602 (e.g., the polarizing mirror 626) can reflect a reflected portion of the second optical signal 622 towards the third mirror 614. The reflected portion of the second optical signal 622 reflected by the polarization beam splitter 602 can have the first polarization (e.g., S polarization). The reflected portion of the second optical signal 622 can pass through the quarter waveplate 616 (e.g., the polarization can be rotated approximately 45 degrees), be reflected by the third mirror 614, pass through the quarter waveplate 616 again (e.g., the polarization can be rotated again approximately 45 degrees), and return to the polarization beam splitter 602 having the second polarization (e.g., P polarization). By passing through the quarter waveplate 616 twice, the polarization of the reflected portion of the second optical signal 622 can be rotated from the first polarization to the second polarization (e.g., rotated 90 degrees). The reflected portion of the second optical signal 622 that returns to and passes through the polarization beam splitter 602 (e.g., passes through the polarizing mirror 626) having the second polarization is the second portion of the second optical signal 622 having the second polarization (e.g., which is optically communicated by the polarization beam splitter 602 to the polarization selector 604).

Moreover, the polarization selector 604 selectively allows the passed optical signal to be optically communicated to the lens 606 during a time period and inhibits the blocked optical signal from being optically communicated to the lens during the time period. The passed optical signal is one of the first portion of the first optical signal 618 having the first polarization or the second portion of the second optical signal 622 having the second polarization. Further, the blocked optical signal is a differing one of the first portion of the first optical signal 618 having the first polarization or the second portion of the second optical signal 622 having the second polarization. For instance, as depicted in FIG. 6, the polarization selector 604 is selectively allowing the first portion of the first optical signal 618 having S polarization to be optically communicated to the lens 606 during a particular time period; in this example, the lens 606 causes the passed optical signal (e.g., the first portion of the first optical signal 618 having S polarization representative of the first eye 620) to be incident on the camera sensor 608 during the time period (e.g., to generate iris scan data of the iris of the first eye 620). Moreover, during a differing time period, the polarization selector 604 can selectively allowing the second portion of the second optical signal 622 having P polarization to instead be optically communicated to the lens 606, where the lens 606 can cause such passed optical signal to be incident on the camera sensor 608 during the differing time period (e.g., to generate iris scan data of the iris of the second eye 624).

Turning now to FIG. 7, depicted is another example of the iris scanning device 102. The iris scanning device 102 of FIG. 7 again includes the polarization beam splitter 602, the polarization selector 604, the lens 606, and the camera sensor 608. In the example of FIG. 7, the iris scanning device 102 includes a first mirror 702, a second mirror 704, and a third mirror 706.

The first mirror 702 is configured to reflect the first optical signal 618 from the first eye 620 to the polarization beam splitter 602. Further, the second mirror 704 is configured to reflect the second optical signal 622 from the second eye 624 to the third mirror 706, and the third mirror 706 is configured to reflect the second optical signal 622 from the second mirror 704 to the polarization beam splitter 602. The first mirror 702 can be a movable mirror (e.g., mounted on a gimbal) that can align with the first eye 620 (e.g., using the above-described processes). Moreover, the second mirror 704 can be a movable mirror (e.g., mounted on a gimbal) that can align with the second eye 624 (e.g., using the above-described processes). Further, the third mirror 706 can be a stationary mirror. The first optical signal 618 received at and reflected by the first mirror 702 can include both P and S polarizations. Likewise, the second optical signal 622 received at and reflected by the second mirror 704 and the third mirror 706 can include both P and S polarizations.

In the embodiment shown in FIG. 7, the polarization beam splitter 602 can optically communicate a first portion of the first optical signal 618 having a first polarization to the polarization selector 604. As illustrated, the first portion of the first optical signal 618 having S polarization is reflected by the polarizing mirror 626 of the polarization beam splitter 602 towards the polarization selector 604. Moreover, the polarization beam splitter 602 inhibits optical communication of a second portion of the first optical signal 618 having a second polarization to the polarization selector 604. For instance, the second portion of the first optical signal 618 having P polarization can pass through the polarizing mirror 626 (e.g., without being reflected towards the polarization selector 604). A path of the second portion of the first optical signal 618 having P polarization is not shown in FIG. 7, as this portion of the first optical signal 618 may be discarded.

The polarization beam splitter 602 can also optically communicate a second portion of the second optical signal 622 having the second polarization to the polarization selector 604, and can inhibit optical communication of a first portion of the second optical signal 622 having the first polarization to the polarization selector 604. As depicted in FIG. 7, the second portion of the second optical signal 622 having P polarization is optically communicated by the polarization beam splitter 602 towards the polarization selector 604. The polarization beam splitter 602 (e.g., the polarizing mirror 626) can allow the second portion of the second optical signal 622 having P polarization to pass through the polarizing mirror 626 towards the polarization selector 604, while the first portion of the second optical signal 622 having S polarization can be reflected by the polarizing mirror 626 and discarded (a path of the first portion of the second optical signal 622 having S polarization is not shown in FIG. 7).

Again, as described above, the polarization selector 604 selectively allows the passed optical signal to be optically communicated to the lens 606 during a time period and inhibits the blocked optical signal from being optically communicated to the lens 606 during the time period. The passed optical signal is one of the first portion of the first optical signal 618 having the first polarization or the second portion of the second optical signal 622 having the second polarization. Further, the blocked optical signal is a differing one of the first portion of the first optical signal 618 having the first polarization or the second portion of the second optical signal 622 having the second polarization. For instance, as depicted in FIG. 7, the polarization selector 604 is selectively allowing the first portion of the first optical signal 618 having S polarization to be optically communicated to the lens 606 during a particular time period; in this example, the lens 606 causes the passed optical signal (e.g., the first portion of the first optical signal 618 having S polarization representative of the first eye 620) to be incident on the camera sensor 608 during the time period (e.g., to generate iris scan data of the iris of the first eye 620). Moreover, during a differing time period, the polarization selector 604 can selectively allowing the second portion of the second optical signal 622 having P polarization to instead be optically communicated to the lens 606, where the lens 606 can cause such passed optical signal to be incident on the camera sensor 608 during the differing time period (e.g., to generate iris scan data of the iris of the second eye 624).

Figure 8A:
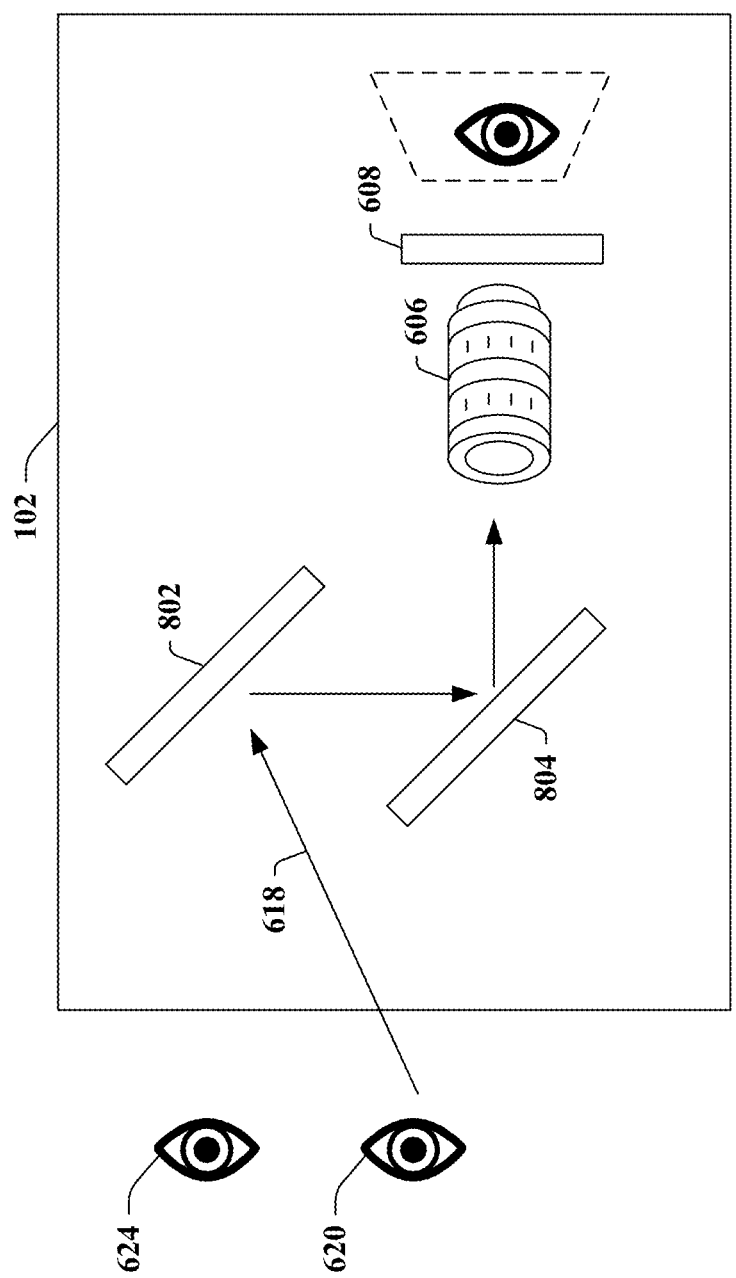
FIGS. 8A-B illustrate an example of the iris scanning device of FIG. 1.

With reference to FIG. 8A, illustrated is another example of the iris scanning device 102 of FIG. 1. The iris scanning device 102 of FIG. 8A includes a selector (not shown in FIG. 8A), the lens 606, and the camera sensor 608. The selector is configured to receive the first optical signal 618. The selector can selectively allow a passed optical signal (e.g., the first optical signal 618) to be optically communicated to the lens 606 during a first time period. Moreover, the selector can selectively inhibit a blocked optical signal (e.g., the second optical signal 622, not illustrated in FIG. 8A) from being optically communicated to the lens 606 during the first time period. In the example depicted in FIG. 8A, the passed optical signal is the first optical signal 618 during the first time period. Further, in the example depicted in FIG. 8A, the blocked optical signal is the second optical signal 622 (not illustrated in FIG. 8A) during the first time period. Moreover, the lens 606 causes the passed optical signal to be incident on the camera sensor 608 during the first time period.

In the example of FIG. 8A, the selector includes a movable mirror 802 (e.g., mounted on a gimbal) and a stationary mirror 804. The movable mirror 802 is controllable to align with the first eye 620 of the user 104 during the first time period (e.g., using the above-described processes). Depending on the alignment of the movable mirror 802, the first optical signal 618 representative of the first eye 620 can be reflected by the movable mirror 802 to the stationary mirror 804 and thereafter can be reflected by the stationary mirror 804 to the lens 606. Accordingly, the passed optical signal (e.g., optically communicated from the stationary mirror 804 to the lens 606), which is representative of the first eye 620 during the first time period, can be reflected by the movable mirror 802 to the stationary mirror 804 and thereafter can be reflected by the stationary mirror 804 to the lens 606.

Figure 8B:
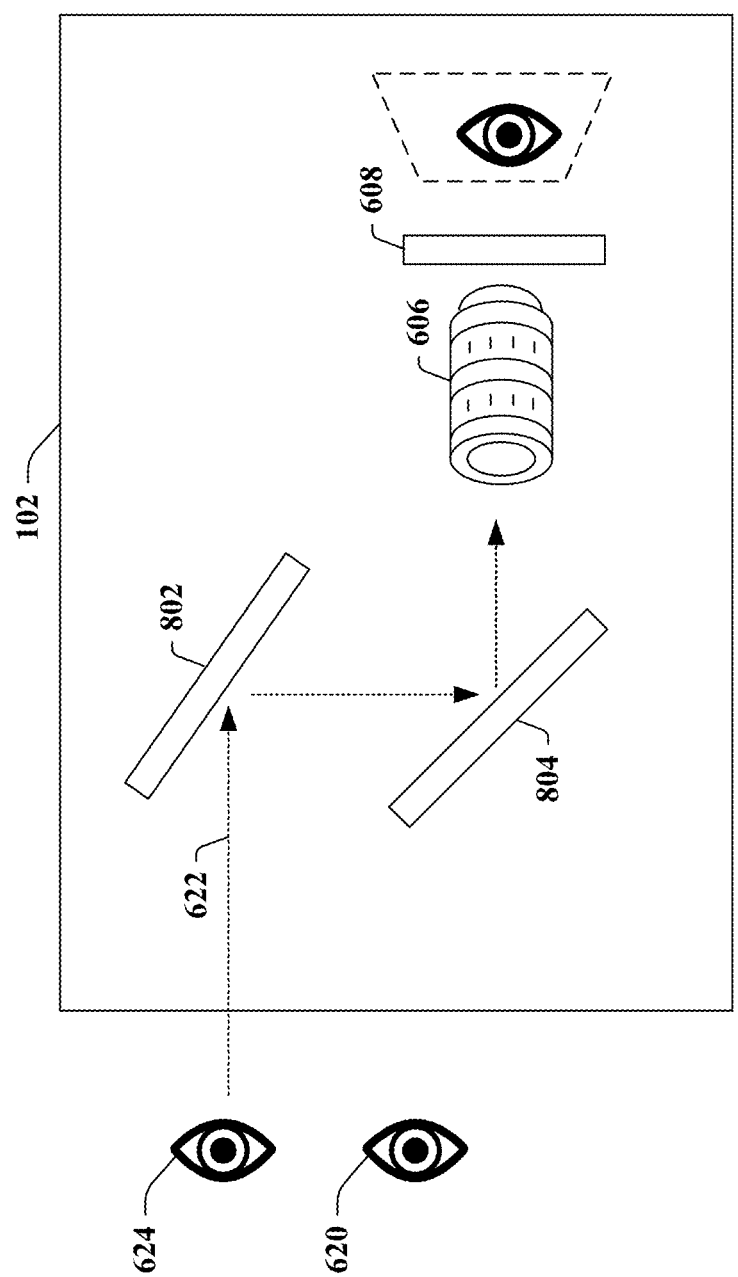

With reference now to FIG. 8B, illustrated is another example of the iris scanning device 102 of FIG. 1. The iris scanning device 102 depicted in FIG. 8B includes the components described above in the description of FIG. 8A (e.g., the selector, the lens 606, and the camera 608). The selector is configured to receive the second optical signal 622. The selector can selectively allow a passed optical signal (e.g., the second optical signal 622) to be optically communicated to the lens 606 during a second time period. Moreover, the selector can selectively inhibit a blocked optical signal (e.g., the first optical signal 618, not illustrated in FIG. 8A) from being optically communicated to the lens 606 during the second time period. In the example depicted in FIG. 8B, the passed optical signal is the second optical signal 622 during the second time period. Further, in the example depicted in FIG. 8B, the blocked optical signal is the first optical signal 618 (not illustrated in FIG. 8B) during the second time period. Moreover, the lens 606 causes the passed optical signal to be incident on the camera sensor 608 during the second time period.

In the example of FIG. 8B, the selector includes the movable mirror 802 (e.g., mounted on a gimbal) and the stationary mirror 804. The movable mirror 802 is controllable to align with the second eye 624 of the user 104 during the second time period (e.g., using the above-described processes). Depending on the alignment of the movable mirror 802, the second optical signal 622 representative of the second eye 624 can be reflected by the movable mirror 802 to the stationary mirror 804 and thereafter can be reflected by the stationary mirror 804 to the lens 606. Accordingly, the passed optical signal (e.g., optically communicated from the stationary mirror 804 to the lens 606), which is representative of the second eye 624 during the second time period, can be reflected by the movable mirror 802 to the stationary mirror 804 and thereafter can be reflected by the stationary mirror 804 to the lens 606.

Reference is now generally made to FIGS. 6, 7, 8A, and 8B. Although not shown, it is contemplated that the iris scanning device 102 shown in such examples can further include the components illustrated in FIG. 1 (e.g., the control circuitry 116, the facial feature detector 114, etc.).

Figure 9:
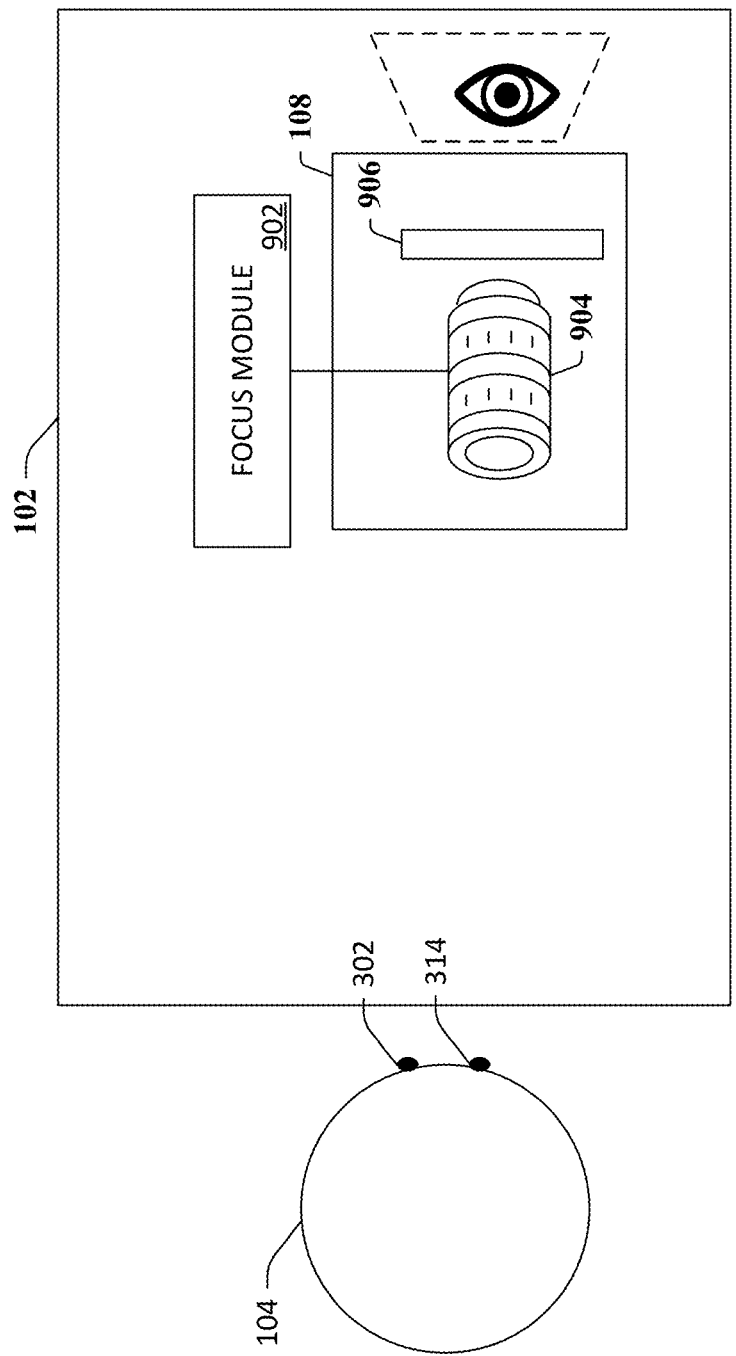
FIG. 9 illustrates an example of the iris scanning device of FIG. 1 according to an embodiment.

Turning now to FIG. 9, the iris scanning device 102 is depicted according to an embodiment. In the embodiment depicted in FIG. 9, the iris scanning device 102 includes a focus module 902. The focus module 902 may be implemented in the software 130 stored in the memory 126. The focus module 902 may include one or more machine learning models. The focus module 902 is configured to adjust a focus of a lens 904 such that a passed optical signal that is received at a camera sensor 906 produces an image in which an eye of the user 104 is in focus. The lens 904 and the camera sensor 906 are part of the second camera 108. The focus module 902 adjusts the focus of the lens 904 based upon images captured by the first camera 106 (e.g., the facial image 202) and/or the second camera 108 (e.g., the first eye image 304). In an example, after an image of the eye 302 (e.g., the left eye 302 in this example) is captured that satisfies the criteria above, the focus module 902 can adjust the focus of the lens 904 from a first focus to a second focus such that the second camera 108 captures an image of the second eye 314 (e.g., the right eye 314 in this example) that is in focus, even when the right eye 314 is in a different plane than the left eye 302 due to the user 104 shifting his/her face during the iris scanning process. Moreover, even when the left eye 302 and the right eye 314 are in the same plane, the focus module 902 functions to compensate for different beam path lengths (e.g., paths through the polarization beam splitter 602).

Figure 10:
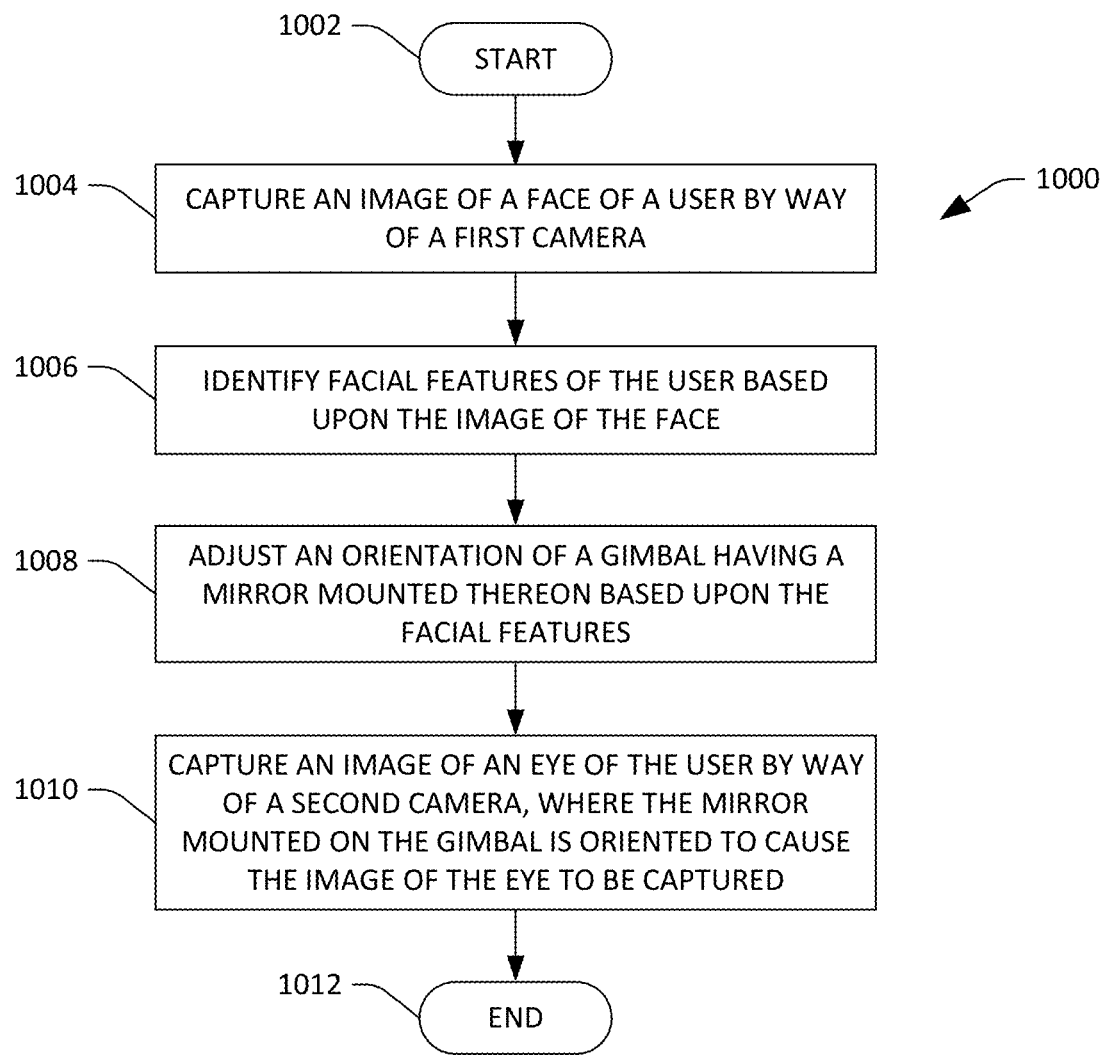
FIG. 10 is a flow diagram that illustrates an exemplary methodology performed by an iris scanning device for capturing an image of an eye of a user.
Figure 11:
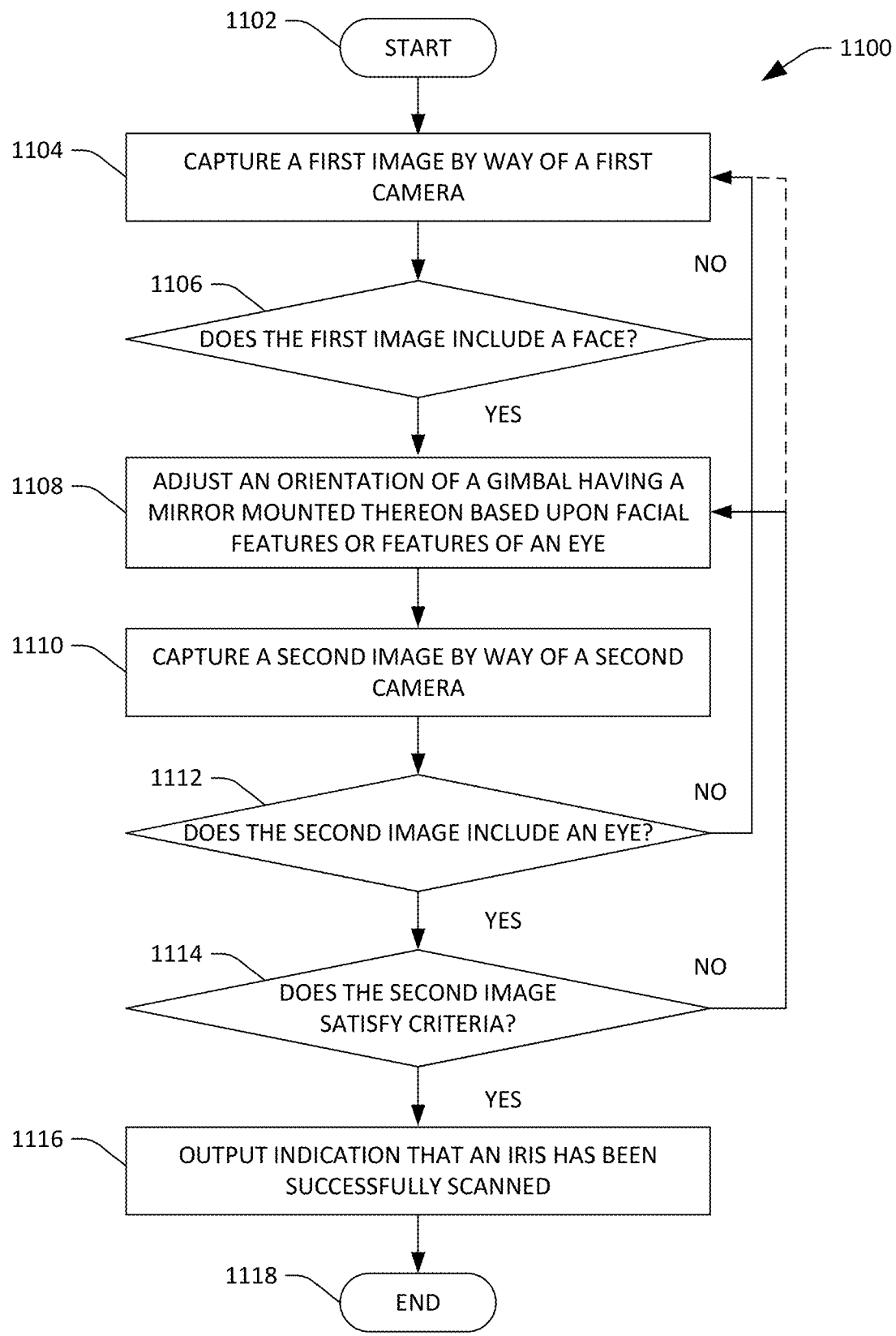
FIG. 11 is a flow diagram that illustrates another exemplary methodology performed by an iris scanning device for capturing an image of an eye of a user.

FIGS. 10 and 11 illustrate exemplary methodologies relating to controlling a two-dimensional mirror gimbal for purposes of iris scanning. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 10, a methodology 1000 performed by an iris scanning device that facilitates capturing an image of an eye of a user is illustrated. The methodology 1000 begins at 1002, and at 1004, the iris scanning device captures an image of a face of a user by way of a first camera comprised by the iris scanning device. At 1006, the iris scanning device identifies facial features of the user based upon the image of the face of the user. At 1008, the iris scanning device adjusts an orientation of a gimbal having a mirror mounted thereon based upon the facial features of the user. The mirror and the gimbal are comprised by the iris scanning device. At 1010, upon adjusting the orientation of the gimbal based upon the facial features of the user, the iris scanning device captures an image of an eye of the user by way of a second camera comprised by the iris scanning device, where the mirror mounted on the gimbal is oriented to cause the image of the eye of the user to be captured. The methodology 1000 concludes at 1012.

Turning now to FIG. 11, a methodology 1100 performed by an iris scanning device that facilitates capturing an image of an eye of a user is illustrated. The methodology 1100 begins at 1102, and at 1104, the iris scanning device captures a first image by way of a first camera comprised by the iris scanning device. At 1106, the iris scanning device determines whether or not the first image includes a face of the user. In an example, the iris scanning device attempts to identify facial features of the user from the first image using a computer-implemented machine learning model. When the first image does not include the face of the user, the methodology 1100 returns to 1104. When the first image does include the face of the user (i.e., the facial features were identified), at 1108, the iris scanning device adjusts an orientation of a gimbal having a mirror mounted thereon based upon the facial features identified from the first image. At 1110, the iris scanning device captures a second image by way of a second camera, where the mirror mounted on the gimbal is oriented to cause the second image to be captured. At 1112, the iris scanning device determines whether or not the second image includes an eye of the user. In an example, the iris scanning device attempts to identify features of the eye of the user using the computer-implemented machine learning model (or another computer-implemented machine learning model). When the second image does not include the eye of the user, the methodology 1100 returns to 1104. When the second image does include the eye of the user (i.e., the features of the eye were identified), at 1114, the iris scanning device determines whether or not the second image satisfies criteria. The criteria include one or more of an iris of the eye being located in a central region of the second image, an entirety of the eye being located within the second image, and/or an area occupied by the iris in the second image being greater than a threshold area. When the second image does not satisfy the criteria, the methodology 1100 returns to 1108, and the orientation of the gimbal is adjusted based upon the features of the eye identified from the second image. According to embodiments, when the second image does not satisfy the criteria, the methodology 1100 may return to 1104 (in addition to 1108), and a (second) image of the face of the user may be captured, and the orientation of the gimbal may be adjusted based upon the features of the eye identified from the second image and the (second) image of the face of the user. When the second image satisfies the criteria, at 1116, the iris scanning device outputs an indication that an iris of the user has been successfully scanned. The methodology 1100 concludes at 1118.

Figure 12:
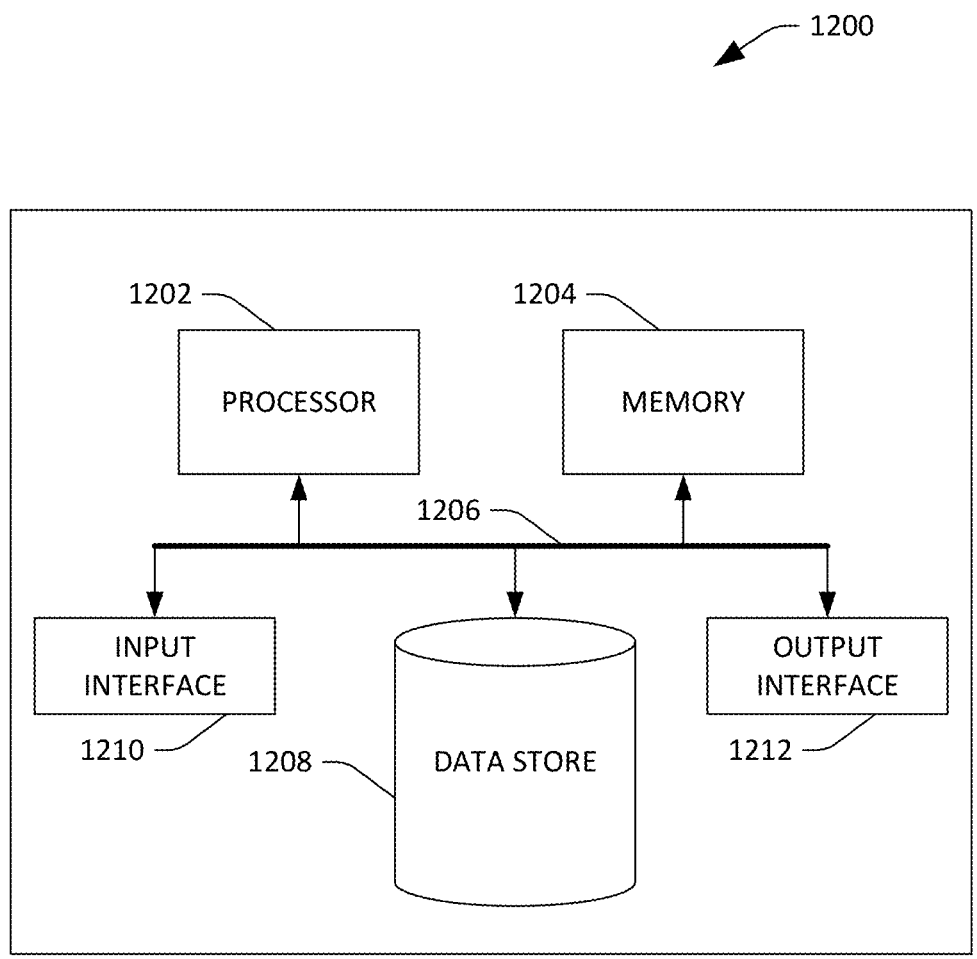
FIG. 12 is an exemplary computing device.

Referring now to FIG. 12, a high-level illustration of an exemplary computing device 1200 that can be used in accordance with the systems and methodologies disclosed herein is illustrated. For instance, the computing device 1200 may be used in a system that identifies facial features of a user and/or features of an eye of the user. By way of another example, the computing device 1200 can be used in a system that adjusts an orientation of a gimbal having a mirror mounted thereon based upon facial features of a user and/or features of an eye of the user such that light reflects off of the mirror causing an image of the eye of the user to be captured. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store images of faces of users, images of eyes of the users, codes generated based upon images of irises of the eyes, computer-implemented machine learning models, etc.

The computing device 1200 additionally includes a data store 1208 that is accessible by the processor 1202 by way of the system bus 1206. The data store 1208 may include executable instructions, images of faces of users, images of eyes of the users, codes generated based upon images of irises of the eyes, computer-implemented machine learning models, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The features described herein relate to an iris scanning device according to at least the examples provided below.

(A1) In one aspect, an iris scanning device includes a first camera that is configured to capture an image of a face of a user of the iris scanning device. The iris scanning device also includes a second camera that is configured to capture an image of an eye of the user subsequent to the image of the face of the user being captured. The iris scanning device further includes a gimbal having a mirror mounted thereon; a facial feature detector that is configured to identify facial features of the user based upon the image of the face of the user; and control circuitry that is configured to, subsequent to capture of the image of the face of the user, adjust an orientation of the gimbal based upon the facial features of the user. The image of the eye of the user is captured upon the orientation of the gimbal being adjusted, wherein the mirror mounted on the gimbal is oriented to cause the image of the eye of the user to be captured.

(A2) In some embodiments of the iris scanning device of (A1), the first camera includes at least one of a red green blue (RGB) camera, a three-dimensional (3D) camera, or a monochrome infrared (IR) camera.

(A3) In some embodiments of the iris scanning device of at least one of (A1)-(A2), the first camera has a first field of view, wherein the second camera has a second field of view.

(A4) In some embodiments of the iris scanning device of (A3), the first field of view ranges from 600 to 180°, and the second field of view ranges from 2° to 10°.

(A5) In some embodiments of the iris scanning device of at least one of (A1)-(A4), the iris scanning device further includes a processor and memory. The facial feature detector is implemented in software stored in the memory, wherein the processor executes the software to identify the facial features of the user based upon the image of the face of the user.

(A6) In some embodiments of the iris scanning device of at least one of (A1)-(A5), the gimbal comprises a first gimbal and a second gimbal, the mirror comprises a first mirror and a second mirror, the first mirror is mounted on the first gimbal and the second mirror is mounted on the second gimbal, the first mirror is oriented to cause the image of the eye of the user to be captured, and the second mirror is oriented to cause an image of a second eye of the user to be captured.

(A7) In some embodiments of the iris scanning device of at least one of (A1)-(A6), the iris scanning device includes a casing that defines a volume within the iris scanning device, wherein the second camera and the gimbal having the mirror mounted thereon are located in the volume within the iris scanning device, wherein light enters the iris scanning device through a transparent or semi-transparent aperture on the casing, wherein the light reflects off of the mirror.

(A8) In some embodiments of the iris scanning device of at least one of (A1)-(A7), the image of the face of the user includes the eye of the user and an additional facial feature of the user, the image of the eye of the user does not include the additional facial feature, and a resolution of the image of the eye of the user is greater than a resolution of the image of the face of the user.

(A9) In some embodiments of the iris scanning device of at least one of (A1)-(A8), the iris scanning device further includes a second mirror, wherein the second mirror is stationary, wherein light is reflected off of the mirror onto the second mirror, thereby causing the image of the eye of the user to be captured.

(B1) In another aspect, some embodiments include a method performed by an iris scanning device for capturing images of irises of users, where the method includes capturing an image of a face of a user of the iris scanning device by way of a first camera comprised by the iris scanning device. The method also includes identifying facial features of the user based upon the image of the face of the user. Further, the method includes adjusting an orientation of a gimbal having a mirror mounted thereon based upon the facial features of the user, wherein the gimbal and the mirror are comprised by the iris scanning device. The method also includes, upon adjusting the orientation of the gimbal based upon the facial features of the user, capturing an image of an eye of the user by way of a second camera comprised by the iris scanning device, wherein the mirror mounted on the gimbal is oriented to cause the image of eye of the user to be captured.

(B2) In some embodiments of the method of (B1), capturing the image of the face of the user, identifying the facial features of the user, adjusting the orientation of the gimbal, and capturing the image of the eye of the user occur as the iris scanning device is held in one or more hands of the user.

(B3) In some embodiments of at least one of the methods of (B1)-(B2), the gimbal is a two-axis gimbal.

(B4) In some embodiments of at least one of the methods of (B1)-(B3), adjusting the orientation of the gimbal based upon the facial features of the user includes: computing a desired angle between the mirror and the eye of the user based upon the facial features; and rotating the gimbal such that an angle between the mirror and the eye of the user is the desired angle, wherein the mirror having the desired angle facilitates capture of the image of the eye of the user.

(B5) In some embodiments of at least one of the methods of (B1)-(B4), the method also includes identifying features of the eye of the user based upon the image of the eye of the user captured by way of the second camera; determining that a portion of the eye of the user is not included in the image of the eye of the user or that an iris of the eye of the user is not located in a central region of the based upon the features of the eye of the user; adjusting the orientation of the gimbal based upon the features of the eye of the user; and, upon adjusting the orientation of the gimbal based upon the features of the eye of the user, capturing a second image of the eye of the user by way of the second camera, wherein the mirror mounted on the gimbal is oriented to cause the second image of the eye of the user to be captured, wherein an entirety of the iris of the eye of the user is located in the second image of the eye of the user.

(B6) In some embodiments of at least one of the methods of (B1)-(B5), a distance between the iris scanning device and the face of the user when the image of the face is captured and when the image of the eye is captured ranges from 15 cm to 50 cm.

(B7) In some embodiments of at least one of the methods of (B1)-(B6), a lens of the second camera has a focal length that ranges from 30 mm to 150 mm.

(B8) In some embodiments of at least one of the methods of (B1)-(B4) and/or (B6)-(B7), the method also includes readjusting the orientation of the gimbal having the mirror mounted thereon based upon the facial features of the user; upon readjusting the orientation of the gimbal based upon the facial features of the user, capturing a second image of a second eye of the user by way of the second camera; determining whether an iris of the eye of the user is located in a central region of the image of the eye of the user; determining whether a second iris of the second eye of the user is located in a central region of the second image of the second eye of the user; and, when the iris of the eye of the user is located in the central region of the image of the eye of the user and when the second iris of the second eye of the user is located in the central region of the second image of the second eye of the user, outputting an audible or visible indication to the user.

(B9) In some embodiments of at least one of the methods of (B1)-(B8), the facial features of the user are identified by way of a machine learning model.

(B10) In some embodiments of at least one of the methods of (B1)-(B4), (B6)-(B7), and/or (B9), the method further includes determining that the eye of the user is opened based upon the image of the eye of the user; identifying an iris of the eye of the user based upon the image of the eye of the user; determining an area occupied by the iris of the eye in the image of the eye of the user; comparing the area to a threshold area; determining a sharpness of the image of the eye of the user; comparing the sharpness to a threshold sharpness; and, when the area exceeds the threshold area and when the sharpness exceeds the threshold sharpness, outputting an audible or visible indication to the user.

(C1) In another aspect, an iris scanning device includes a first camera that is configured to capture an image of a face of a user of the iris scanning device. The iris scanning device also includes a second camera that is configured to capture a first image of an eye of the user subsequent to the image of the face of the user being captured; and capture a second image of the eye of the user subsequent to the first image of the eye of the user being captured, wherein an iris of the eye of the user is located in a central region of the second image of the eye of the user. The iris scanning device further includes a gimbal having a mirror mounted thereon. The iris scanning device also includes a facial feature detector that is configured to identify facial features of the user based upon the image of the face of the user and identify features of the eye of the user based upon the first image of the eye of the user. Moreover, the iris scanning device includes control circuitry that is configured to: subsequent to capture of the image of the face of the user, adjust an orientation of the gimbal based upon the facial features of the user, wherein the first image of the eye of the user is captured upon the orientation of the gimbal being adjusted based upon the facial features of the user, wherein the mirror mounted on the gimbal is oriented to cause the first image of the eye of the user to be captured; and subsequent to capture of the first image of the eye of the user, adjust the orientation of the gimbal based upon the features of the eye of the user, wherein the second image of the eye of the user is captured upon the orientation of the gimbal being adjusted based upon the features of the eye of the user, wherein the mirror mounted on the gimbal is oriented to cause the second image of the eye of the user to be captured.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An iris scanning device, comprising:
 a gimbal having a mirror mounted thereon;
 a camera;
 control circuitry configured to orient the gimbal having the mirror mounted thereon such that an image of an eye of a user of the iris scanning device is captured, wherein the gimbal is oriented such that an angle between the eye of the user and the mirror mounted on the gimbal causes the image of the eye of the user to be captured by the camera; and
 a facial feature detector configured to:
  identify features of the eye of the user from the image of the eye of the user; and
  determine whether the image of the eye of the user satisfies criteria based upon the features of the eye;
 wherein the control circuitry is further configured to adjust the orientation of the gimbal having the mirror mounted thereon based upon the features of the eye when the image of the eye of the user does not satisfy the criteria, wherein the mirror mounted on the gimbal is oriented to cause a second image of the eye of the user to be captured by the camera upon the orientation being adjusted based upon the features of the eye.

2. The iris scanning device of claim 1, wherein the criteria comprises a representation of an iris of the eye being located in a central region of the image of the eye.

3. The iris scanning device of claim 1, wherein the criteria comprises a representation of an entirety of the eye being located in the image of the eye.

4. The iris scanning device of claim 1, wherein the criteria comprises an area occupied by a representation of an iris of the eye being greater than a threshold area within the image of the eye.

5. The iris scanning device of claim 1, wherein the criteria comprises a sharpness of the image of the eye being greater than a threshold sharpness.

6. The iris scanning device of claim 1, wherein a code is generated based upon the image of the eye of the user when the image of the eye satisfies the criteria.

7. The iris scanning device of claim 1, wherein:
 the facial feature detector is further configured to:
  identify second features of the eye of the user from the second image of the eye of the user; and
  determine whether the second image of the eye of the user satisfies the criteria based upon the second features of the eye; and
 a code is generated based upon the second image of the eye of the user when the second image of the eye satisfies the criteria.

8. The iris scanning device of claim 1, further comprising:
 a processor; and memory, wherein the facial feature detector is at least partially implemented in software stored in the memory, wherein the processor executes the software to identify the features of the eye of the user from the image of the eye of the user and determine whether the image of the eye of the user satisfies the criteria based upon the features of the eye.

9. The iris scanning device of claim 1, further comprising:
a processor; and
memory, wherein the control circuitry is at least partially implemented in software stored in the memory.

10. The iris scanning device of claim 1, further comprising:
a differing camera configured to capture an image of a face of the user;
wherein the facial feature detector is further configured to:
identify facial features of the user based upon the image of the face of the user; and
predict a location of the eye of the user based upon the facial features of the user; and
wherein the control circuitry is further configured to orient the gimbal having the mirror mounted thereon based on the predicted location of the eye of the user to capture the image of the eye of the user.

11. The iris scanning device of claim 1, wherein the camera captures a video stream of the eye of the user, and wherein the video stream comprises the image of the eye of the user and the second image of the eye of the user.

12. The iris scanning device of claim 1, further comprising:
a feedback element configured to output an indication signifying that the image of the eye of the user satisfies the criteria, wherein the feedback element outputs the indication responsive to the facial feature detector determining that the image of the eye of the user satisfies the criteria based upon the image of the eye.

13. The iris scanning device of claim 12, wherein the feedback element comprises at least one of a speaker, a light emitting diode, or a haptic feedback device.

14. The iris scanning device of claim 1, wherein the camera is configured to capture the image of the eye of the user while a lens of the camera of the iris scanning device is at a distance in a range from 15 cm to 50 cm from the eye of the user.

15. The iris scanning device of claim 1, wherein the camera is configured to capture the image of the eye of the user while the iris scanning device is held in one or more hands of the user.

16. A method performed by an iris scanning device, comprising:
orienting a gimbal having a mirror mounted thereon based on an angle between an eye of a user of the iris scanning device and the mirror mounted on the gimbal;
capturing an image of the eye of the user of the iris scanning device via a camera of the iris scanning device, wherein the gimbal is oriented such that the angle between the eye of the user and the mirror mounted on the gimbal causes the image of the eye of the user to be captured by the camera;
identifying features of the eye of the user from the image of the eye of the user;
determining whether the image of the eye of the user satisfies criteria based upon the features of the eye; and
when the image of the eye does not satisfy the criteria:
adjusting the orientation of the gimbal having the mirror mounted thereon based upon the features of the eye; and
capturing a second image of the eye of the user via the camera, wherein the mirror mounted on the gimbal is oriented to cause the second image of the eye of the user to be captured by the camera upon the orientation being adjusted based upon the features of the eye.

17. The method of claim 16, further comprising:
generating a code based upon the image of the eye of the user when the image of the eye satisfies the criteria.

18. The method of claim 16, further comprising:
identifying second features of the eye of the user from the second image of the eye of the user;
determining whether the second image of the eye of the user satisfies the criteria based upon the second features of the eye; and
generating a code based upon the second image of the eye of the user when the second image of the eye satisfies the criteria.

19. The method of claim 16, further comprising:
capturing an image of a face of the user via a differing camera;
identifying facial features of the user based upon the image of the face of the user; and
predicting a location of the eye of the user based upon the facial features of the user; and
wherein the gimbal having the mirror mounted thereon is oriented based on the predicted location of the eye of the user to capture the image of the eye of the user.

20. An iris scanning device, comprising:
a gimbal having a mirror mounted thereon;
a camera;
a processor; and
memory that stores computer-executable instructions that, when executed by the processor, cause the processor to perform acts comprising:
controlling the gimbal having the mirror mounted thereon to be oriented such that an image of an eye of a user of the iris scanning device is captured, wherein the gimbal is oriented such that an angle between the eye of the user and the mirror mounted on the gimbal causes the image of the eye of the user to be captured by the camera;
identifying features of the eye of the user from the image of the eye of the user;
determining whether the image of the eye of the user satisfies criteria based upon the features of the eye; and
controlling the gimbal having the mirror mounted thereon to adjust the orientation based upon the features of the eye when the image of the eye of the user does not satisfy the criteria, wherein the mirror mounted on the gimbal is oriented to cause a second image of the eye of the user to be captured by the camera upon the orientation being adjusted based upon the features of the eye.

* * * * *